United States Patent
Balazs et al.

(10) Patent No.: US 9,444,824 B1
(45) Date of Patent: Sep. 13, 2016

(54) METHODS, SYSTEMS, AND ARTICLES OF MANUFACTURE FOR IMPLEMENTING ADAPTIVE LEVELS OF ASSURANCE IN A FINANCIAL MANAGEMENT SYSTEM

(71) Applicant: Intuit Inc., Mountain View, CA (US)

(72) Inventors: Alex G. Balazs, San Diego, CA (US); Xiaoyan C. Liu-Barker, San Diego, CA (US); Douglas L. Foiles, San Diego, CA (US); Thomas M. Pigoski, II, San Francisco, CA (US); Robert E. Lee, Tempe, AZ (US)

(73) Assignee: INTUIT INC., Mountain View, CA (US)

( * ) Notice: Subject to any disclaimer, the term of this patent is extended or adjusted under 35 U.S.C. 154(b) by 93 days.

(21) Appl. No.: 14/194,490

(22) Filed: Feb. 28, 2014

(51) Int. Cl.
*G06F 17/30* (2006.01)
*H04L 29/06* (2006.01)

(52) U.S. Cl.
CPC ............. *H04L 63/105* (2013.01); *H04L 63/08* (2013.01)

(58) Field of Classification Search
None
See application file for complete search history.

(56) References Cited

U.S. PATENT DOCUMENTS

| 2005/0015591 | A1* | 1/2005 | Thrash | G06F 21/33 713/166 |
| 2011/0016513 | A1* | 1/2011 | Bailey, Jr. | 726/5 |
| 2012/0144464 | A1* | 6/2012 | Fakhrai et al. | 726/6 |
| 2013/0086645 | A1* | 4/2013 | Srinivasan et al. | 726/4 |

* cited by examiner

*Primary Examiner* — Fatoumata Traore
(74) *Attorney, Agent, or Firm* — Vista IP Law Group LLP

(57) ABSTRACT

Disclosed are methods, systems, and articles of manufacture for implementing adaptive levels of authentication assurance according to sensitivity or criticality of information accessed or actions performed in a financial management system to enhance user experience and usability of the financial management system while providing adequate security to safeguard sensitive data. Various flow nodes are associated with one or more levels of assurance which are further associated with some authentication tokens of different authentication strengths. Users are usually first authenticated with a lower authentication strength token. Risk profiles may also be accessed to examine the users' requests for access for fraud detection or prevention purposes. As users attempt to access more sensitive data at a higher level of assurance beyond the authorized level, further authentication with higher authentication strength and involving more user efforts in completing the authentication is required before users are authorized on the higher level of assurance.

39 Claims, 18 Drawing Sheets

404
Identify Potential Threats

- Theft of Physical Token(s) / Authentication Device(s)
- Discovery of Response(s) to Token Prompt(s)
- Duplication of Token(s)
- Eavesdropping to Reveal Token Secret(s) or Authenticator
- Offline Cracking with Analytical Methods Outside the Authentication Mechanisms
- Phishing or Pharming to Capture Token Secret(s) or Authenticator
- Social Engineering to Establish A False Level of Trust with Users
- Online Guessing to Guess A Valid Token Authenticator
- Man-in-the-Middle Attacks
- Boy-in-the-Browser
- Man-in-the-Browser

| Threat | Countermeasures |
|---|---|
| Theft of Token | PIN / Biometric |
| Discovery of Response | Increase Difficulty in Discovering Responses |
| Duplication of Tokens | Use Hardware Cryptographic Token |
| Eavesdropping | Token with Dynamic Authenticator / Out-of-Band Authentication |
| Offline Cracking | Limit Failed Attempts |
| Phishing or Pharming | Token with Dynamic Authenticator |
| Social Engineering | Token with Dynamic Authenticator |
| Online Guessing | Token with High Entropy Token Secrets |
| Man-in-the-Middle Attack | Cryptographic Protocols, Mutual Trusted Certification Authority |
| Man-in-the-Browser Attack | Out-of-Band Authentication |

FIG. 4B

702 First Level of Assurance
- Access Non-Sensitive & Non-Critical Data
- Plaintext Password
- Cryptographic Methods Optional

704 Second Level of Assurance
- Single Factor Remote Network Authentication
- Resist Online Guessing, Session Hijacking, Replay, Eavesdropping Attacks

706 Third Level of Assurance
- Mulit-Factor Remote Network Authentication
- Identify Proofing with Proof of Possession of Allowed Types of Security Tokens through Cryptographic Protocol(s) & Cryptographic Strength Mechanisms for Threats or Risks Associated with Second Level of Assurance

708 Fourth Level of Assurance
- Strong Cryptographic Authentication of All Communicating Parties & All Sensitive Data Transfer;
- All Threats Or Risks Associated with Third Level of Assurance Are Protected
- Resist Man-in-the Middle Or Man-in-the-Browser
- Long-Term Shared Auth. Secrets Are Never Revealed
- Temporary Shared Auth. Secrets May Be Provided to Independent Verifier Who Is Subject to Authentication

FIG. 7

| Flow Nodes | LOA | LOA |
|---|---|---|
| Login to Financial Management System | 20 | C |
| Multiple Logins from Different Devices | 25 | B |
| Multiple Logins from Different Geographical Locations | 30 | A |
| Multiple Logins Multiple Times within A Duration | 30 | A |
| Multiple Logins from Different Geographical Locations & with Different Devices within A Duration | 25 | B |
| Access Account Information | 25 | B |
| Electronic-Filing | 30 | A |
| Access Information Including Taxpayer Identification Number, Etc. | 25 | B |
| Access Information Including Date of Birth | 25 | B |
| Actions Involving Monetary Transaction(s) | 30 | A |
| Access Personal Information | 15 | D |
| Access Login Information | 20 | C |
| Browse General Information | 0 | D |

FIG. 8A

| Authentication Schemes / Tokens | LOA | LOA |
|---|---|---|
| Username + Password + Out-of-Band Authentication | 30 | A |
| Combinations of Multiple Authentication Schemes / Tokens | 30 | A |
| Username + Password + SMS | 25 | B |
| Virtual Keyboard + Pointing Device | 25 | B |
| Strong Customer Authentication | 25 | B |
| 3-D Secure | 25 | B |
| Multi-Factor Authentication | 25 | B |
| SSL / PKI | 20 | C |
| TLS (Transport Layer Security) | 20 | C |
| Biometric Authentication | 20 | C |
| Biometric Authentication with Dynamic Element(s) | 20 | C |
| Automatic Login wit Different Passwords | 15 | D |
| Username + Password + Challenge - Response | 15 | D |
| Security Tokens | 10 | E |
| Username + Password | 10 | E |

FIG. 8B

| Authentication Schemes / Tokens (802C) | LOA (804C) | LOA (806C) |
|---|---|---|
| Username + Password + Out-of-Band Authentication | 30 | A |
| Multi-Factor Cryptographic Device(s) | 40 | B |
| Strong Cryptographic Authentication | 40 | B |
| FIPS 201 Compliant Personal Identity Verification (PIV) Card | 40 | B |
| Multi-Factor One-Time Password Device(s) | 40 | B |
| Cryptographic Strength Mechanism Protected Primary Authentication Token(s) | 30 | B |
| Multi-Factor Software Cryptographic Token(s) | 30 | B |
| Single-Factor One-Time Token Device(s) | 20 | C |
| Out-of-Band Token(s) | 20 | C |
| Look-Up Secret Token(s) | 20 | C |
| Pre-Registered Knowledge Token(s) | 20 | C |
| Memorized Secret Token(s) | 20 | D |
| Single Factor Remote Network Authentication | 20 | D |
| Simple Challenge-Response | 10 | E |
| Plaintext Password w/o Cryptographic Mechanism | 10 | E |

FIG. 8C

METHODS, SYSTEMS, AND ARTICLES OF MANUFACTURE FOR IMPLEMENTING ADAPTIVE LEVELS OF ASSURANCE IN A FINANCIAL MANAGEMENT SYSTEM

BACKGROUND

Developers of software products or services such as personal or corporate financial management systems oftentimes encounter the challenge between security protection of sensitive, confidential, or critical information or data (collectively sensitive information) and usability and user experience in using the software products or services. Security concerns may be generally resolved by "securing the gate" such that a user of the software products or services is required to be properly authenticated and authorized by one or more authentication or authorization (hereinafter authenticate or authentication) processes before the user may access certain information or perform certain actions in the software products or services.

Market analytics from various sources have shown that complex authentication processes may sometimes cause a negative impact on the users' experience and/or the usability of the software products or services and thus pose a barrier the marketability or adoption of the software products or services. In addition, not all information accessible by users or user actions in a software product or service are equally sensitive or critical so as to require the same level of assurance. Requiring a user to go through, for example, a strong authentication process or system that require more tedious may nevertheless steer some potential customers away from adopting the software products or services, although such strong authentication process or system offers heightened protection for these potential customers.

SUMMARY

Disclosed are various embodiments of methods, systems, and articles of manufactures for implementing adaptive levels of assurance in a financial management system.

Various embodiments are directed at methods for implementing adaptive levels of assurance according to sensitivity, criticality, or confidentiality (collectively sensitivity) of information accessed or actions performed in a financial management system to enhance user experience and usability of the financial management system while providing adequate security to safeguard sensitive data. The method associate various flow nodes in a flow for using a software product or service including the financial management system with one or more levels of assurance. The one or more levels of assurance are further associated with or mapped to some authentication tokens having different authentication strengths. When a user first requests to access the software product or service, the user may be first authenticated with a lower authentication strength token or even no authentication required. The method may optionally examine the request for access or one or more characteristics associated with the request for access to determine whether or not a heightened level of assurance having a higher authentication strength token than the lower authentication strength token is required or desired to authenticate and authorize the user issuing the request for access for fraud detection or fraud prevention purposes.

The user may then be authorized to access the data or information or to perform actions permitted by the authorized level of assurance corresponding to the lower authentication strength token or no authentication. The user is thus not burdened by the more complex authentication efforts required by higher authentication tokens of higher authentication strengths. The user experience in using and the usability of the software product or service is hence enhanced or improved by using the authentication tokens of lower authentication strengths or no authentication at all. As the user attempts to access information or data of higher sensitivity, confidentiality, or criticality at a higher level of assurance beyond the currently authorized level of assurance, the method may further require authentication of the user with an authentication token having higher authentication strength. The use of the higher authentication strength tokens involves more user efforts in completing the authentication before users are authorized on the higher level of assurance.

For example, the user may be required to retrieve an SMS (Short Message Service) message including another authenticator (e.g., a code or a personal identification number) from a communication device (e.g., a mobile phone) and complete the primary authentication by entering the authenticator in the current authentication process. As another example, the user may be required to obtain biometric information (e.g., finger print, voice, handwriting, facial recognition, eye-scan, etc.) from one or more biometric information capturing devices and complete the primary authentication process by transmitting the captured biometric information to the verifier (e.g., the financial management system) for verification. As statistics have shown, such more complex efforts on the part of users have been proved to thwart user adoption rate or marketability of the provided software products or services. By adapting the levels of assurance to the extent or degree of sensitivity, confidentiality, or criticality of information or data to be accessed or actions that may compromise the sensitivity, confidentiality, or criticality of information or data in flows of the execution of software products or services, the method enhances user experience in the flows of and usability of the software products or services including a financial management system.

In some embodiments, a financial management system may be defined to include any computing systems, packages, programs, modules, or applications that gather financial data, have the capability to receive or retrieve financial data, including account and/or transaction data from linked financial institution accounts of the user (such as transaction and balance data in linked checking, savings, money marked and credit card accounts) and/or computers or point of sale (POS) devices of merchants from which the user has purchased items, analyze and categorize at least part of the financial data into various reports or displays that are provided to user, and provides the user with the capability to conduct, and/or monitor, financial transactions without having to log into their individual accounts. Financial management systems may be used for receipt collection, personal financial management, accounting, inventory, and asset management, healthcare expense tracking.

Specific examples of financial management systems, including personal and business finance management systems and tax preparation applications for management of tax matters and preparation of electronic tax returns that are currently available and in which embodiments may be implemented include, but are not limited to, desktop and online versions of TURBOTAX tax return preparation application, QUICKBOOKS, QUICKEN, MINT and FINANCEWORKS financial management systems, Intuit Payments and Intuit Payroll Services, all of which are available from Intuit Inc. of Mountain View, Calif. TURBOTAX, QUICK- BOOKS, QUICKEN, MINT and FINANCEWORKS are registered trademarks of Intuit Inc. In some of these embodiments, a financial management system does not include online banking products or services. The method may optionally perform one or more other tasks including risk assessment or risk management, cyber-intelligence, predictive analytics, fraud detection, fraud prevention, machine learning, data mining, statistics, modeling, or heuristics-based analyses, etc. to further aid the implementation of adaptive levels of assurance according to sensitivity or criticality of information accessed or actions performed in a financial management system to enhance user experience and usability of the financial management system while providing adequate security to safeguard sensitive data.

Some embodiments are directed at implementing adaptive levels of assurance according to sensitivity, criticality, or confidentiality (collectively sensitivity) of information accessed or actions performed in a tax return preparation software product or service to enhance user experience and usability of the financial management system while providing adequate security to safeguard sensitive data. In some of these embodiments, the tax return preparation software product or service includes for example, but not limited to, an online tax return preparation software product or service such as the online version of TURBOTAX tax preparation application available from Intuit Inc. of Mountain View, Calif. Tax return preparation applications such as TURBOTAX tax return preparation application generate a series of interview screens displayed on a screen of the user's computing device and that present questions and fields for the user to type in data, transfer data from a prior year electronic tax return, or import data from an electronic file of, for example, QUICKEN financial management system.

Some embodiments are directed at an apparatus for implementing various processes described herein. More details about the apparatus for implementing various processes will be described in some of the subsequent paragraphs with reference to one or more drawing figures.

Some embodiments are directed at an article of manufacture having stored thereupon a sequence of instructions which, when executed by a computing system, causes the computing system to perform various processes or to invoke various modules described herein to implement adaptive levels of assurance in a financial management system. More details about the article of manufacture will be described in some of the subsequent paragraphs with reference to one or more drawing figures.

Further details of various embodiments of the invention are described in the Detailed Description section with reference to respective figures.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which:

FIG. 4A illustrates some illustrative potential threats that may be identified by the sub-process or sub-module illustrated in FIG. 4 in some embodiments.

FIG. 4B illustrates some illustrative countermeasures that may be used to counter the illustrative potential threats illustrated in FIG. 4A in some embodiments.

FIG. 7 illustrates some illustrative levels of assurance that may be associated with various points in a software flow for the use of a financial management system in some embodiments.

FIG. 8A illustrates some illustrative association of various levels of assurance with some illustrative flow nodes in a flow for the use of a financial management system in some embodiments.

FIG. 8B illustrates some illustrative association of various levels of assurance with some illustrative authentication schemes for the use of a financial management system in some embodiments.

FIG. 8C illustrates some illustrative association of various levels of assurance with some other illustrative flow nodes in a flow for the use of a financial management system in some embodiments.

DETAILED DESCRIPTION OF ILLUSTRATED EMBODIMENTS

Various embodiments are directed to methods, systems, and computer program products for implementing adaptive levels of assurance in a financial management system. Other objects, features, and advantages of embodiments of the invention are described in the detailed description, figures, and claims.

Some embodiments implement adaptive levels of assurance according to sensitivity or criticality of information accessed or actions performed in a financial management system to enhance user experience and usability of the financial management system while providing adequate security to safeguard sensitive data. Various flow nodes are associated with one or more levels of assurance which are further associated with some authentication tokens of different authentication strengths. When a user accesses the financial management system, the user may be first authenticated with a lower authentication strength token or no authentication at all. As the user attempts to access more sensitive, critical, or confidential data or information at a higher level of assurance beyond what the authorized level of assurance permits, further authentication with higher authentication strength and involving more user efforts in completing the authentication may be required before users are authorized on the higher level of assurance.

Various embodiments will now be described in detail with reference to the drawings, which are provided as illustrative examples of the invention so as to enable those skilled in the art to practice the invention. Notably, the figures and the examples below are not meant to limit the scope of embodiments. Where certain elements of embodiments can be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments. Further, embodiments encompass present and future known equivalents to the components referred to herein by way of illustration.

Figure 1:
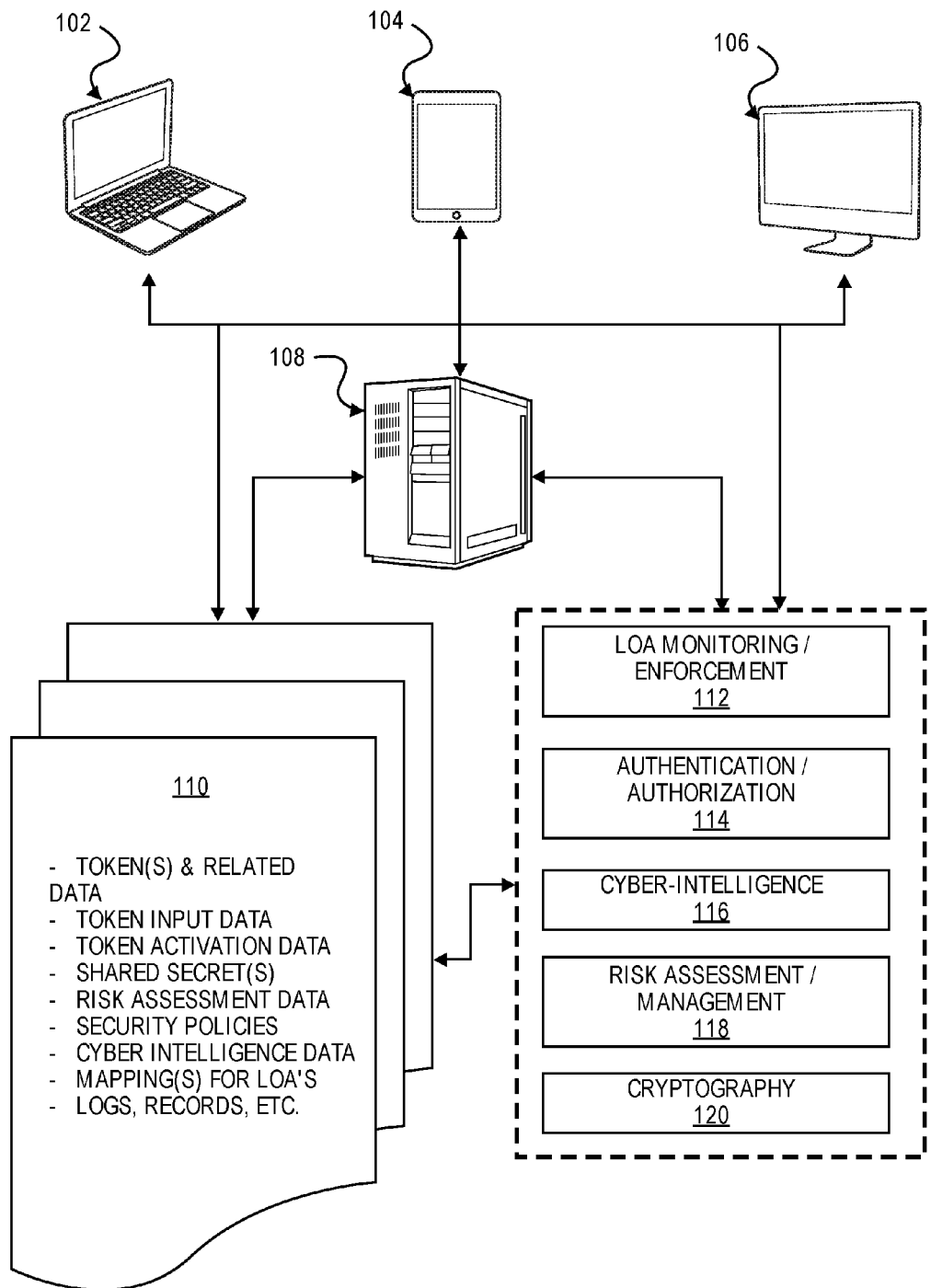
FIG. 1 illustrates a schematic representation of a system for implementing adaptive levels of assurance in a financial management system in some embodiments.

FIG. 1 illustrates a schematic representation of a system for implementing adaptive levels of assurance in a financial management system in some embodiments. In one or more embodiments, the system comprises a computing system 108 that includes at least one process having one or more processor cores, each of which executes one or more threads of execution. The computing system or cluster of computing systems 108 interacts with a plurality of remote computing devices 102, 104, and 106 to provide products, services, resources, or actions, such as electronic records, computing resources, etc., to the plurality of remote computing devices. The remote computing devices may comprise, but not limited to, a mobile computer, a mobile telecommunication device (e.g., a smart phone, an Internet tablet, etc.), a server, a server cluster, etc. The software products or services provided to users may be installed on one or more of the plurality of remote computing devices 102, 104, or 106 or may be hosted in part or entirely on the computing system or cluster of computing systems 108 that is linked to the plurality of computing systems 102, 104, or 106 via various network connections (e.g., personal area networks, local area networks, campus area networks, metropolitan area networks, or wide area networks, etc.).

The computing system or cluster of computing systems 108 is operatively connected to a storage medium 110 such as a volatile or non-volatile non-transitory computer accessible storage medium, which stores thereupon, for example but not limited to, one or more tokens and data related to the one or more tokens, input data for the one or more tokens, activation data for the one or more tokens, long-term or shared information or data for authentication, risk assessment information or data, one or more security policies, cyber-intelligence information or data, one or more mappings for various levels of assurance, one or more logs for the system, or any other information, data, analytics, or records related to security or user experiences with the provided products or services, etc. in one or more embodiments. A token may comprise an object that is used to control access and is passed between cooperating entities in a protocol that synchronizes use of a shared resource or may include a secret that is to be used in authentication processes in some embodiments.

A token may include something that a user possesses and controls (e.g., a cryptographic module or password) that is used to authenticate the user's identity in some embodiments. A token may be possessed by a user and may be controlled through one or more authentication factors (e.g., something a user knows, something a user has, or something a user is). A token may include, for example but not limited to, a password, a cryptographic key, a physical device (e.g., a smart card, a security dongle, etc.) used to store cryptographic information or to perform cryptographic functions, etc. in some embodiments. Token input data may be used to generate the authenticator, which may be generated through the use of the token by performing some functions (e.g., mathematical functions) using the token secret and one or more optional token input values, and may include, for example, a challenge or nonce.

A nonce may include a value used in security protocols or authentication schemes that is never repeated with the same key. An authenticator may comprise a function of the token secret and/or the nonce or the challenge in some embodiments. In some of these embodiments, an authenticator may be the token secret itself. Token activation data may be required to activate the token and permit the generation of an authenticator in some embodiments. A token secret may include a secret value, contained with the token, which is used to derive token authenticators. A token authenticator includes one or more output values generated by a token where the ability to generate valid token authenticators on demand proves that the user possesses and controls the token. It shall be noted that protocol messages sent to the verifier (e.g., the authentication module of the financial management system) depend on the specific token authenticators, but the messages may or may not expressly include the token authenticators.

In some embodiments where the token is something a user knows (e.g., a password or a memorized secret), the token activation may be implicit. Some illustrative token activation data may include, for example but not limited to, a personal identification number or some biometric information of the user. Shared secrets are shared between a verifier and a user to be authenticated and may include long-term shared authentication secrets or temporary shared authentication secrets (e.g., session shared secrets). Illustrative shared secrets may include a response to a challenge, a shared key, etc. A shared secret may be revealed to one or more parties involved in the authentication process, depending at least in part upon the levels of assurance. Risk assessment data may include information or data related to risk assessment or risk management, both of which are described with further details below. Security policies may include one or more policies of the developer of the software products or services regarding various requirements, guidelines, and/or options in implementing various security measures and countermeasures, various controls or directives over identified or potential threats or risks, or compliance with one or more regulations, protocols, or directives of government agencies, etc.

In one or more embodiments, the method or the system for implementing different passwords for multi-tier access comprises or operatively interacts with one or more processes or one or more hardware modules for monitoring, identification, or enforcement of various levels of assurance 112. The method or the system may further comprise or interact with a process or hardware module 114 for performing authentication and authorization. This process or module 114 may be used to identify a client, an entity, or a user (hereinafter a user) who attempts to access the system to access various products, services, resources, or actions or to perform certain actions; the process or module 114 may be further used to authenticate the user and then authorize the user to access certain permitted products, services, resources, or actions or to perform certain permitted actions in these embodiments.

In one or more embodiments, the method or the system for implementing adaptive levels of assurance in a financial management system in some embodiments may further comprise or operatively configured or programmed to interact with a cyber-intelligence module 116, which may be implemented as software, hardware, or a combination thereof, and may be utilized to perform or execute various functions to ensure that adaptive levels of assurance are provided in the flows of the provided software products or services. The cyber-intelligence module 116 may perform various functions to safeguard cybersecurity, computer security, or Internet fraud detection and prevention.

For example, the cyber-intelligence module 116 may perform predictive analytics to use techniques including statistics, modeling, machine learning, or data mining to collect and analyze various types of current or historical data to predict the occurrence or likelihood of some future events or to analyze customer satisfaction level in using the financial management system. The cyber-intelligence module 116 may also be used alone or in conjunction with one or more other processes or modules to perform risk assessment or risk management in some embodiments. In the embodiments illustrated in FIG. 1, the method or the system may comprise or may be configured or programmed to interact with a risk assessment or risk management process or module 118 which may be used to assess or manage risks or threats. In one or more embodiments, the method or the system may comprise or may be programmed to interact with a cryptography module 120 to provide secure communication between one or more users and the system or to provide cryptographic mechanisms for authentication.

Figure 2:
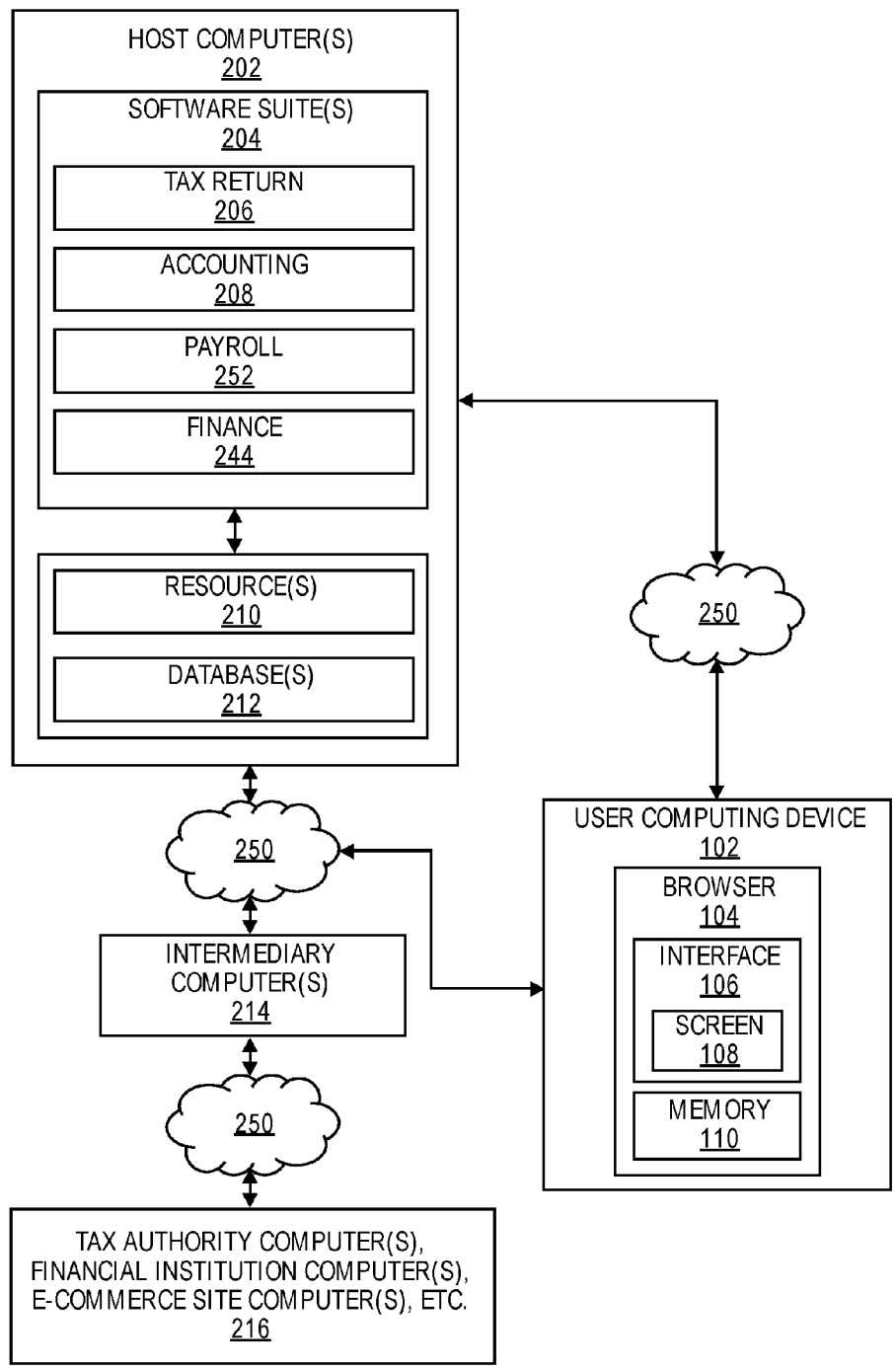
FIG. 2 illustrates another schematic representation of one or more systems for implementing adaptive levels of assurance in a financial management system in some embodiments.

FIG. 2 illustrates another schematic representation of one or more systems for implementing adaptive levels of assurance in a financial management system in some embodiments. More specifically, the illustrative schematic diagram shows a user computing device 102 including a browser 104 that further includes an interface 106 having a screen 108 and corresponds to some non-transitory memory 110. The client computing device 102 may be operatively connected to one or more host computers 202 via network 250 to access the financial management system including one or more personal or business financial management products or services or one or more tax preparation applications products or services 204 (e.g., TURBOTAX tax preparation application, QUICKBOOKS, QUICKEN, MINT and FINANCEWORKS financial management systems. In some embodiments, the financial management system does not include an online banking product or service. For ease of explanation, a financial management system is defined as including personal and business financial management products and services and tax return preparation applications, which are used in tax management and preparation of electronic tax returns for filing with a tax authority such as the Internal Revenue Service (IRS) or a state or local tax authority.

In some of the embodiments illustrated in FIG. 2, the one or more software products or services 204 may be hosted in part on entirely on the one or more host computers 202 from which a user computing device 102 may request access to the hosted software products or services. In some other embodiments, the one or more software products or services may be installed in part or entirely on the user computing device 102.

The one or more software products or services 204 may also be coupled to or in communication with one or more resources 210 or one or more databases 212. For example, in embodiments involving a tax return preparation application, the one or more host computers 202 may be operatively coupled to or in communication with one or more intermediate computers 214 such as some intermediate servers which may be in turn coupled to or in communication with one or more computers of a tax authority (e.g., Internal Revenue Service) through one or more networks As another example, the one or more software products or services 204 may be coupled to or in communication with of one or more financial institutions (e.g., banks, credit card issuing institutions, payment gateways, etc.), or of one or more e-commerce sites 216 via network 250.

Figure 3:
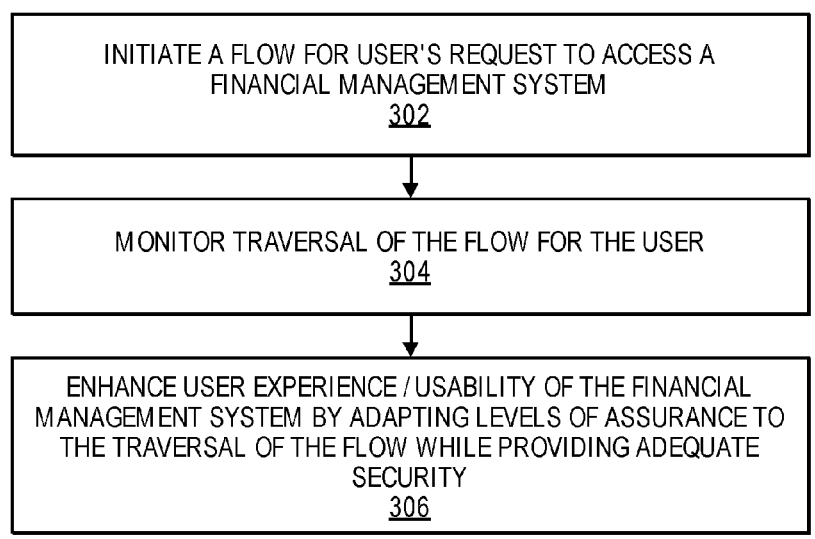
FIG. 3 illustrates a top level flow diagram of a process or a hardware module for schematic representation of a system for implementing adaptive levels of assurance in a financial management system in some embodiments.

FIG. 3 illustrates a top level flow diagram of a process or a hardware module for schematic representation of a system for implementing adaptive levels of assurance in a financial management system in some embodiments. In these embodiments, a computing system (e.g., a user's computing device or a host computer or server) may execute instructions to initiate a flow in response to a user's request for access to the financial management system at 302. For example, upon receiving a use's request to access TURBOTAX tax preparation application hosted on a remote host computer, the remote host computer may initiate a flow.

A flow includes one or more sub-flows each including one or more flow nodes through which a user may traverse when interacting with a software product or service. A flow node represents a flow state that defines the experience that a user will be going through. A flow node may be further associated with one or more functionalities including, for example, one or more input variables to pass information into a flow when the flow starts or one or more modal specifications to allow running an entire flow or a portion thereof in a modal window including a pop-up window. The computing system may further execute instructions to continuously, periodically, or randomly monitor traversal or progression of the flow for the user at 304 for the method or system to determine whether or not triggering even resulting in a change in the current level of assurance has occurred.

The computing system may further execute instructions to enhance the user's experience in using the financial management system while providing adequate security by adapting levels of assurance to the traversal of the flow at 306 in some embodiments. In some of these embodiments, the computing system may adapt the levels of assurance to the traversal of the flow by authenticating the user with different authentication schemes appropriate to fulfill the requirements of corresponding levels of assurance. In some embodiments, various authentication processes, schemes, or tokens (collectively token or authentication token) may be used to provide various levels of assurance with various levels of complexities and user interactions with the authentication processes. For example, a multi-factor authentication process, which may provide some enhanced level of assurance, may require a user to identify multiple tokens from multiple sources (e.g., biometrics, SMS or Short Message Service messages, etc.) at different points in the authentication process.

Figure 3A:
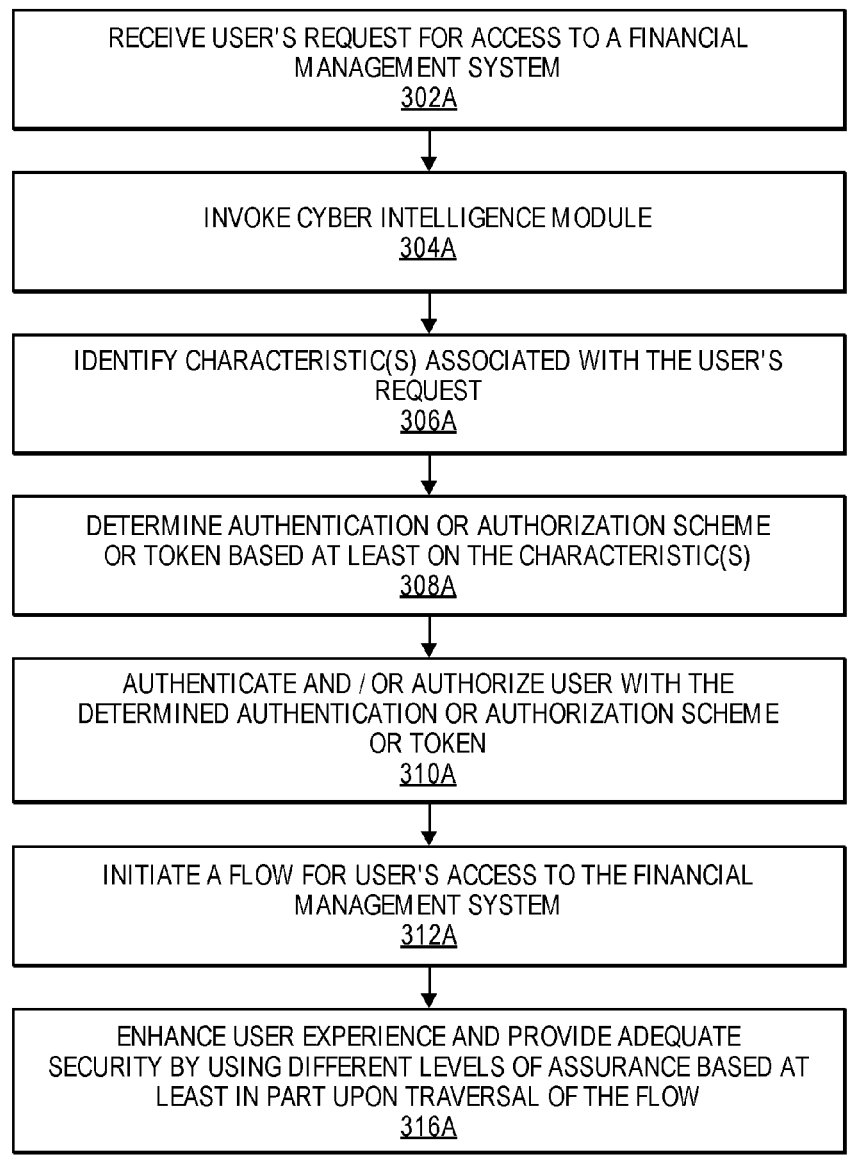
FIG. 3A illustrates a more detailed flow diagram of the process or the hardware module for implementing adaptive levels of assurance in a financial management system in some embodiments.

FIG. 3A illustrates a more detailed flow diagram of the process or the hardware module for implementing adaptive levels of assurance in a financial management system in some embodiments. In the embodiments illustrated in FIG. 3A, the method or system may, at 302A, receive a user's request for access to a financial management system which may include, for example, a tax preparation product or service, an accounting product or service, a payroll product or service, or a personal or corporate finance product or service. In some of these embodiments, the financial management system does not include online or mobile banking products or services. The method or system may invoke a cyber-intelligence module at 304A and to identify one or more characteristics associated with the user's request at 306A to safeguard cybersecurity, computer security, or Internet fraud detection and prevention.

In these embodiments, the one or more characteristics may include, for example but not limited to, frequency of requests from the user such as the total number of requests from the user within a period of time, geographic locations in which the user has initiated the requests, network locations from which the user has initiated the requests, the device identifications (e.g., media access control or MAC addresses) of the devices with which the user has used in issuing the requests, actions of the user (e.g., merely browsing, copying, or printing information about personal information without actively attempting to further complete the flow), any other recognized or predicted behavior anomalies, or any combinations thereof. These one or more characteristics may be stored in one or more risk profiles or one or more policies referenced by various processes, modules, or systems described herein.

An adaptive level of assurance may be determined at 308A based at least in part upon the one or more identified characteristics associated with the user's request. In addition to the other examples described herein, the method or system may invoke the cyber-intelligence process or module to examine the user's request, one or more characteristics associated with the user's request, or one or more user's actions taken during the flow to change or determine the adequate level of assurance. For example, the cyber-intelligence module may increase the current level of assurance and thus require an authentication token at some heightened security level based on, for example, the screens or pages the user is attempting to visit. As a practical example, the cyber-intelligence process or module may increase the level of assurance when a user, after logging in, attempts to access some sensitive information or data such as the taxpayer identification number, information of the user's one or more accounts (e.g., bank account, direct deposit account, etc.), or any information that may be used to commit fraud or fraudulent transactions.

The cyber-intelligence process or module may also increase the level of assurance to some heightened level when a user, for example, attempts to access (e.g., adding, deleting, modifying, copying, or simply viewing the same screen or page for an extended period of time, etc.) payee information on a software payroll product or service. The method or the system may then authenticate the user with the determined or identified authentication scheme at 310A. Once the user is properly authenticated, the method or the system may initiate a flow to fulfill the user's request for access to the financial management system at 312A. At 314A, the progression or traversal of the flow may be randomly, periodically, or continuously monitored by, for example, the level of assurance monitoring or enforcement module 112 to adaptively provide the adequate level of assurance based at least in part upon the sensitivity or criticality of the information to be presented to the user or action to be executed by the user. The method or system may the enhance the user experience while providing adequate security by using appropriate levels of assurance based at least in part upon the traversal of the flow at 316A.

As a practical example, the method or system may examine one or more characteristics associated with the user's request for fraud detection and prevention in some embodiments. For example, the cyber-intelligence module may detect that the same user has a first request to access an online tax return preparation product or service from within the United States and a second request to access the same in two hours from another country. The cyber-intelligence module may determine that second request may constitute a fraudulent request. The method or system may raise the level of assurance in response and require heightened security by, for example, demanding a stronger authentication scheme than what is usually provided for accessing the main screen of the financial management system.

For example, the method or system may, in addition to the username and password for primary authentication, require a multi-factor or multi-stage authentication scheme that sends a verification code to an email address or phone number of the user on record or require some biometric information from the user to allow the user to log onto the financial management system for the second request, whereas the user may only need the username and password to log onto the same financial management system for the first request. A multi-factor authentication scheme includes a characteristic of the authentication scheme or of the token that uses more than one authenticator factor (e.g., something you know, something you are, or something you have.) Once the user is properly authenticated for the second request, the method or system may initiate a flow for fulfilling the second request while providing adaptive levels of assurance during various stages or at various flow nodes of the flow.

Figure 3B:
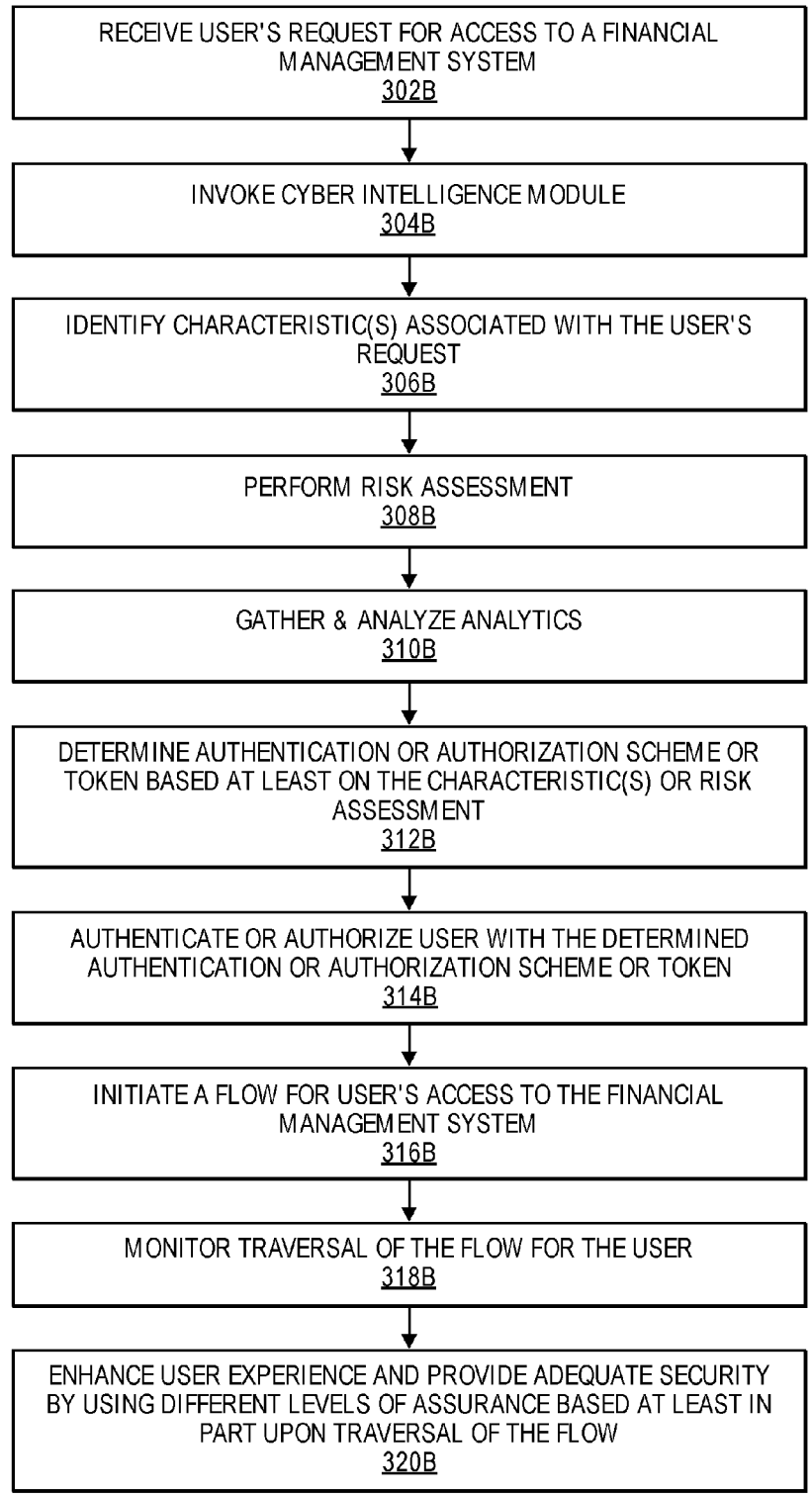
FIG. 3B illustrates another more detailed flow diagram of the process or the hardware module for implementing adaptive levels of assurance in a financial management system in some embodiments.

FIG. 3B illustrates another more detailed flow diagram of the method or system for implementing adaptive levels of assurance in a financial management system in some embodiments. In the embodiments illustrated in FIG. 3B, the method or system illustrated in FIG. 3B may receive a user's request for access to a financial management system which may include, for example, a tax preparation product or service, an accounting product or service, a payroll product or service, or a personal or corporate finance product or service. In some of these embodiments, the financial management system does not include online or mobile banking products or services.

For example, a user may visit the webpage of the website hosting TURBOTAX tax preparation application available from Intuit Inc. to request for access to the online tax return preparation software product or service at 302B. The method or system may optionally invoke the cyber-intelligence module (e.g., the cyber-intelligence module 116) in conjunction with zero or more other modules either before or after receiving the user's request at 304B. The method or system may then optionally identify one or more characteristics associated with the user's request for access for the method or system to utilize the cyber-intelligence module to examine the request itself or one or more identified characteristics associated with the user's request at 306B. In these embodiments, the one or more characteristics may include, for example but not limited to, frequency of requests from the user such as the total number of requests from the user within a period of time, geographic locations in which the user has initiated the requests, network locations from which the user has initiated the requests, the device identifications (e.g., media access control or MAC addresses) of the devices with which the user has used in issuing the requests, actions of the user (e.g., merely browsing, copying, or printing information about personal information without actively attempting to further complete the flow), any other recognized or predicted behavior anomalies, or any combinations thereof.

Optional risk assessment or management may also be performed to assess, rank, or manage potential risks or threats or to associate the potential risks or threats with various levels of assurance or security measures at 308B by using, for example the risk assessment or management process or module 118. More details about risk assessment or management are described in the subsequent paragraphs with reference to FIG. 4. At 310B, the method or system may optionally gather and analyze various analytics using the cyber-intelligence module to use various techniques including statistics, modeling, machine learning, or data mining to collect and analyze various types of current or historical data, information, or patterns to, for example, analyze or identify opportunities (e.g., customer satisfaction level in using the financial management system) or to identify or predict risks (e.g., the occurrence or likelihood of some future events).

Based at least in part upon the user's request, the one or more characteristics associated with the user's request, the results of risk assessment or management, or the results of analyzing analytics, the method or system may determine an appropriate authentication scheme at 312B. Upon the user's successful completion of the authentication and/or authorization processes, the method or system may then authorize the user to access at least a part of the financial management system that is associated with the current level of assurance as permitted or safeguarded by the identified authentication scheme at 314B. A flow may be initiated in response to the user's request at 316B, and the system or module may further monitor the traversal or progression of the flow for the user's session at 318B to ensure to provide adaptive levels of assurance as the user proceeds with the flow in the user's access to the financial management system. The method may the enhance the user experience while providing adequate security by using appropriate levels of assurance based at least in part upon the traversal of the flow at 316B.

Figure 4:
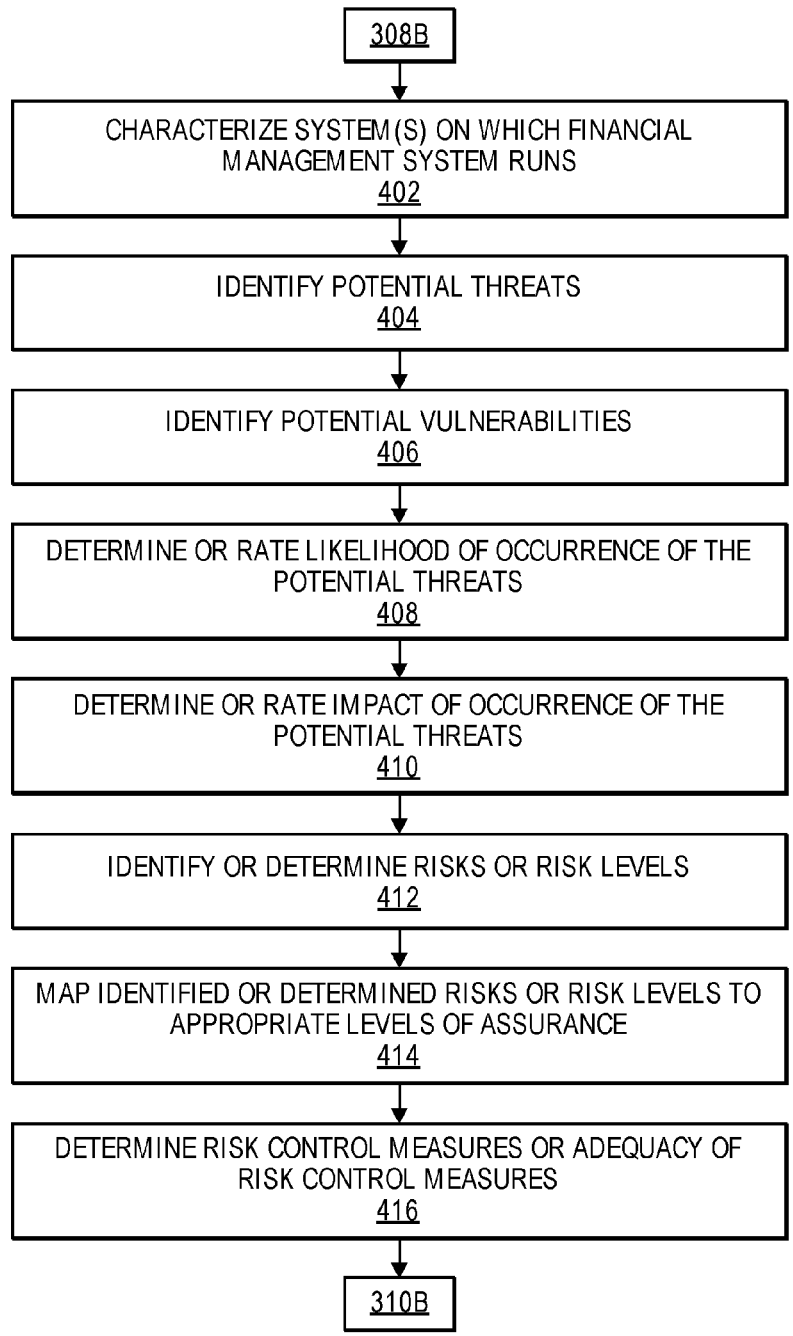
FIG. 4 illustrates a flow diagram of a sub-process or sub-module for performing the process or executing the hardware module illustrated in FIG. 3B in some embodiments.

FIG. 4 illustrates a flow diagram of a sub-process or sub-module for performing the process or executing the hardware module illustrated in FIG. 3B in some embodiments. More specifically, FIG. illustrates a flow diagram of an illustrative risk assessment or management process 308B illustrated in FIG. 3B. In the embodiments illustrated in FIG. 4, the method or system may characterize one or more computing systems on which the financial management system resides at 402. For example, the method or system may quantitatively or qualitatively assess the one or more servers in conjunction with one or more peripherals (e.g., storage devices, database systems, network components, protocols, coding of software applications, etc.) that jointly provide the software products or services of the financial management system or the user's computing device in conjunction with one or more peripherals that jointly provide the software products or services of the financial management system.

In some embodiments, the method or system may use the tools and methodologies as specified in the National Institute of Standards and Technology (NIST) Special Publication (SP) 800-30 "Guide for Conducting Risk Assessment", Rev. 1, Sep. 2012. In some embodiments, the method or system may use the tools and methodologies in accordance with the guidelines, reports, data, or information from, for example, Federal Computer Incident Response Center (FedCIRC), Office of Inspector General (OIG) of the U.S. Dept. of Health & Human Services, or the National Infrastructure Protection Center (NIPC). In addition or in the alternative, the method or system may characterize the one or more computing systems based at least in part on prior risk assessment or management results or known attacks. The method or system may identify one or more potential threats to the security or safekeeping of the information or data or the integrity of the one or more systems involved in providing the software products or services of the financial system at 404.

At 406, the method or system may identify one or more potential vulnerabilities. In some of these embodiments, the method or system may identify one or more potential vulnerabilities of the financial management system or various software solutions or hardware modules involved in providing the financial management system to users based at least in part upon the results of characterizing or assessing the one or more computing systems at 402 and/or the identified threats. For example, the method or system may find that the current security policies do not support or demand strong mutual authentication or strong encryption and identify the man-in-the-middle attack as a potential vulnerability of the overall system at 406. At 408, the method or system may also optionally determine, rate, or rank the likelihood of occurrence of the potential threats identified at 406 or determine, rate, or rank the impact, the likelihood of occurrence, or the magnitude of damages of the potential threats identified at 404.

In some of these embodiments, the method or system may make such determination, rating, or ranking based at least in part upon absolute or relative extent or degree of harm in, for example, loss of integrity, loss of availability, loss of confidentiality, loss of customer faith or base, or even monetary losses. Based at least in part upon the identified potential threats or potential vulnerabilities, the method or system may identify or determine risks or levels of risks at 412 and map the identified or determined risks or levels of risks to appropriate levels of assurance at 414. In some embodiments where the levels of assurance are associated with or mapped to security measures or countermeasures or risk control measures or countermeasures (e.g., authentication schemes, security policies, etc.), the method or system may further determine the corresponding risk control measures or countermeasures or the adequacy of risk control measures or countermeasures at 416.

FIG. 4A illustrates some illustrative potential threats that may be identified by the sub-process or sub-module illustrated in FIG. 4 in some embodiments. It shall be noted that the potential threats listed in FIG. 4A are illustrative and non-exhaustive, and are not intended to limit the scope of this description or the scope of the claims to these explicitly recited potential threats. For example, potential threats may include theft of physical tokens or authentication devices or discovery of responses to token prompts by, for example, searching various data sources (e.g., social media sites). Potential threats may also include duplication of tokens by, for example, copying, keylogging, etc. Eavesdropping may also be identified as a potential threat to reveal token secrets or authenticator associated with the token by, for example, keylogging, man-in-the-browser attacks, man-in-the-mobile attacks, or boy-in-the-browser attacks.

Offline cracking with analytical methods outside the authentication mechanisms by, for example, extracting keys with differential power analysis on hardware tokens may also be identified as a potential threat. Phishing or pharming to capture token secrets or authenticators, online guessing to guess a valid token authenticator, or social engineering to establish a false level of trust with users may also be identified as potential threats to the one or more systems providing the financial management system to the users. Various known attacks such as the man-in-the-middle attacks, man-in-the-browser attacks, or boy-in-the-browser attacks, etc. may also be identified as potential threats by the process or module 404.

FIG. 4B illustrates some illustrative countermeasures that may be used to counter the illustrative potential threats illustrated in FIG. 4A in some embodiments. The left-hand column 402B illustrates some illustrative threats, and the right-hand column 404B illustrates some illustrative security measures or countermeasures against the corresponding threats. For example, the method or system may associate the security measures or countermeasures of requiring a static or dynamic personal identification number (PIN) or some biometric information of a user (e.g., finger print, voice, handwriting, facial recognition, eye-scan, etc.) from one or more biometric information capturing devices to counter the potential threat of theft of authentication tokens. The method or system may increase the difficulty in discovering token responses to counter the potential threat of discovery of token responses by using less frequently asked challenges.

The method or system may use dynamic authenticators or out-of-band authentication schemes to counter the potential threat of eavesdropping. The method or system may limit the permissible number of attempts to enter token secrets to counter the potential threat of offline cracking. The method or system may utilize tokens with dynamic authenticators where knowledge of one authenticator is not used to derive subsequent authenticators to counter the potential threats of phishing or pharming or social engineering establishing false level of trust with users. The method or system may utilize tokens with high entropy token secret (high entropy tokens), high entropy authenticators, or tokes that lock up after a number of repeated failed authentication attempts to counter the potential threat of online guessing or offline cracking.

Entropy may be defined as a measure of the amount of uncertainty (e.g., guessing entropy or min-entropy) that an attacker faces to determine the value of a secret and may be stated in bits in some embodiments. For example, the method or system may increase the measure of the uncertainty or the average unpredictability in the randomness of the token secrets or authenticators (e.g., the uncertainty of a random variable or element associated with the token or authenticator) by, for example, using token secrets having longer bit-length or use a larger set of characters (e.g., the 94 ISO characters while requiring special characters in the token secrets, rather than merely 36 alphanumeric characters for the token secrets). The method or system may utilize cryptographic mechanisms of various strengths, a mutual trusted certification authority, or out-of-band authentication to counter man-in-the-middle attacks or to utilize out-of-authentication to counter man-in-the-browser attacks.

Figure 5:
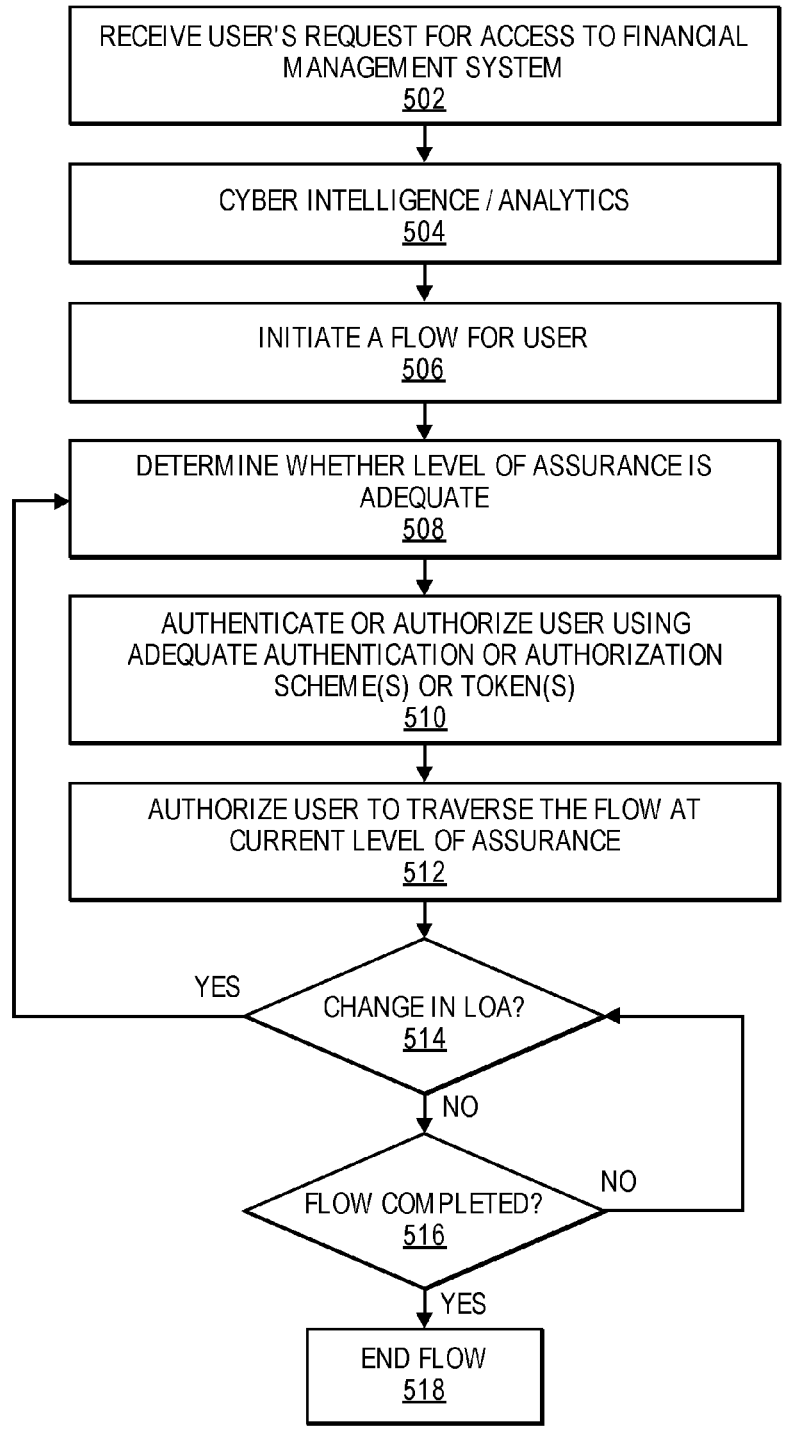
FIG. 5 illustrates another illustrative flow diagram of the process or the hardware module for implementing adaptive levels of assurance in a financial management system in some embodiments.

FIG. 5 illustrates another illustrative top level flow diagram of the method or system for implementing adaptive levels of assurance in a financial management system in some embodiments. More specifically, the method or system may receive a user's request for access to a financial management system at 502. A cyber-intelligence process or module or an analytics collection or analysis process or module may be optionally invoked, either before or after receiving the user's request for access at 504. The cyber-intelligence process or module or the analytics collection or analysis process or module may randomly, periodically, or continuously run to perform their respective functions as described above.

The method or system may then initiate a flow in response to the user's request for access at 506. For example, the method or system may present the homepage containing no sensitive, critical, or confidential information of the financial management system to the user upon receiving the user's request. At 510, the method or system may authenticate the user by using an adequate authentication scheme. In some of the embodiments illustrated in FIG. 5, the method or system may identify the adequate authentication scheme based at least in part upon the results of the cyber-intelligence process or module or the analytics gathering or analysis process or module.

Once the user is properly authenticated at an appropriate level of assurance associated with the adequate authentication scheme, the method or system may authorize the user to traverse the flow established in response to the user's request as far as the appropriate level of assurance permits at 512. For example, the user may be permitted to access the information or data or perform actions that are permitted by the appropriate level of assurance as well as lower levels of assurance associated with less sensitive, less confidential, or less critical information or data but is not permitted to access the information or data or perform actions that are permitted by higher levels of assurance.

At 514, the method or system may continue to traverse the flow and determine whether the flow has progressed to a point where a change in the level of assurance arises. If the method or system affirmatively determines that a change in the level of assurance arises, the method or system may return to 508 to determine another adequate level of assurance to accommodate the change in the level of assurance. Otherwise, the method or system may proceed to 516 to determine whether the flow has completed. If the method or system determines that the flow has not completed, the method or system may return to 514. Otherwise, the method or system may proceed to 518 to end the flow for the user's request.

Figure 6A:
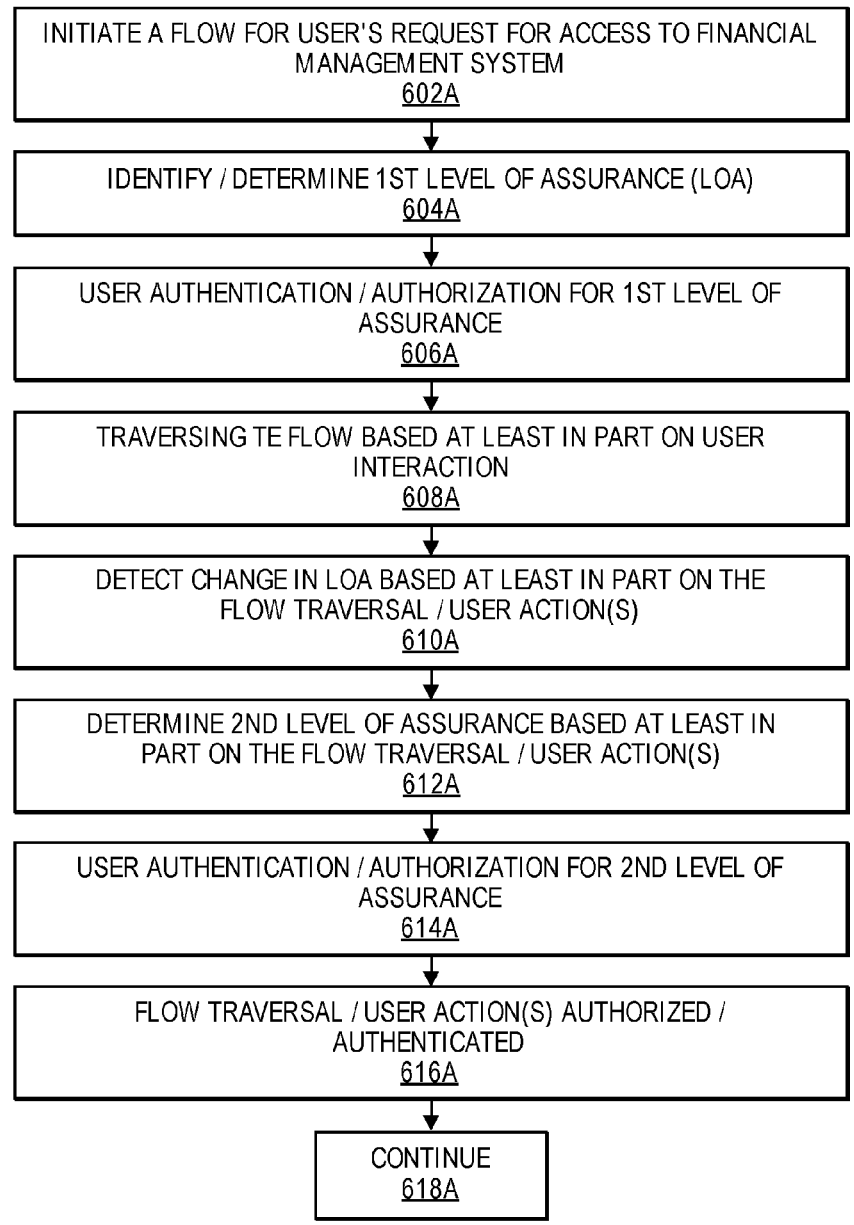
FIG. 6A illustrates another illustrative flow diagram of the process or the hardware module for implementing adaptive levels of assurance in a financial management system in some embodiments.

FIG. 6A illustrates another illustrative flow diagram of the method or system for implementing adaptive levels of assurance in a financial management system in some embodiments. In the embodiments illustrated in FIG. 6A, the method or system may initiate a flow in response to a user's request for access to a financial management system at 602A and identify or determine a first level of assurance (LOA) at 604A. The method or system may then authenticate a user for the first level of assurance at 606A such that the user may be authorized to access the data or information or to perform actions permitted at the first level of assurance. The method or system may monitor the traversal of the flow at 608A based at least in part upon one or more user actions or interactions during the user's access to the financial management system.

The method or system may detect whether there is going to be a change in the level of assurance at 610A based at least in part upon one or more flow nodes encountered in the flow or user actions or interactions during the user's access to the financial management system. For example, the user may be initially authenticated by the username and password to access the financial management system. During the user's interaction with the financial management system, the user may wish to access information including, for example, the user's social security number, the user's bank account information, the user's birthday, or other more sensitive, confidential, or critical information that the user is not authorized to view or access at the current level of assurance. The method or system may determine that there is going to be a change in the current level of assurance to a heightened level of assurance at 610A.

Upon or shortly after the detection of a change in the level of assurance, the method or system may then determine or identify a second level of assurance based at least in part upon the flow traversal or the user's actions at 612A and authenticate the user for the second level of assurance with the corresponding or associated authentication scheme at 614A. Once the user successful completes the authentication for the second level of assurance, the method or system may authorize the user to proceed with the flow or to perform the actions permitted on the second level of assurance at 616A and continue with the flow at 618A

Figure 6B:
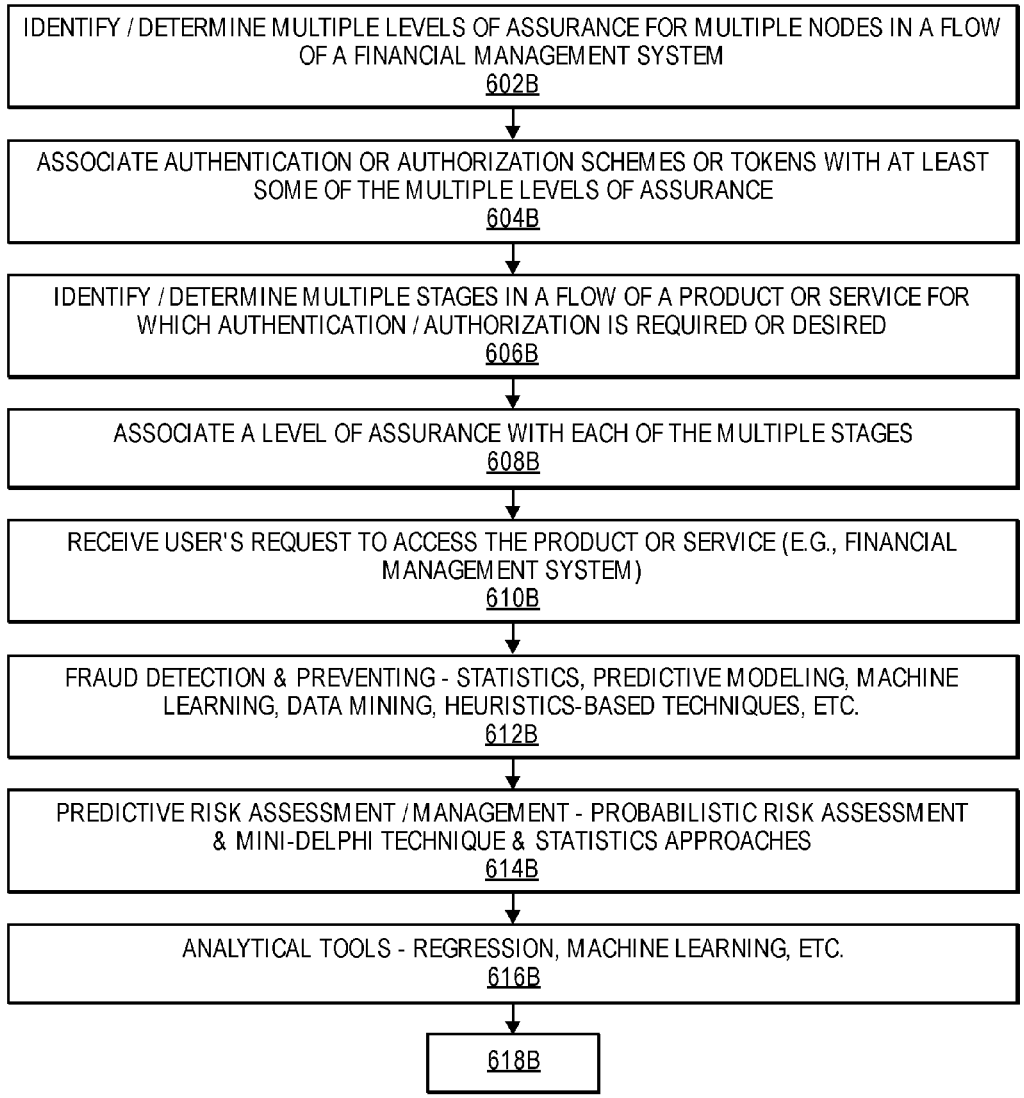
FIGS. 6B-6C jointly illustrate another illustrative flow diagram of the process or the hardware module for implementing adaptive levels of assurance in a financial management system in some embodiments.
Figure 6C:
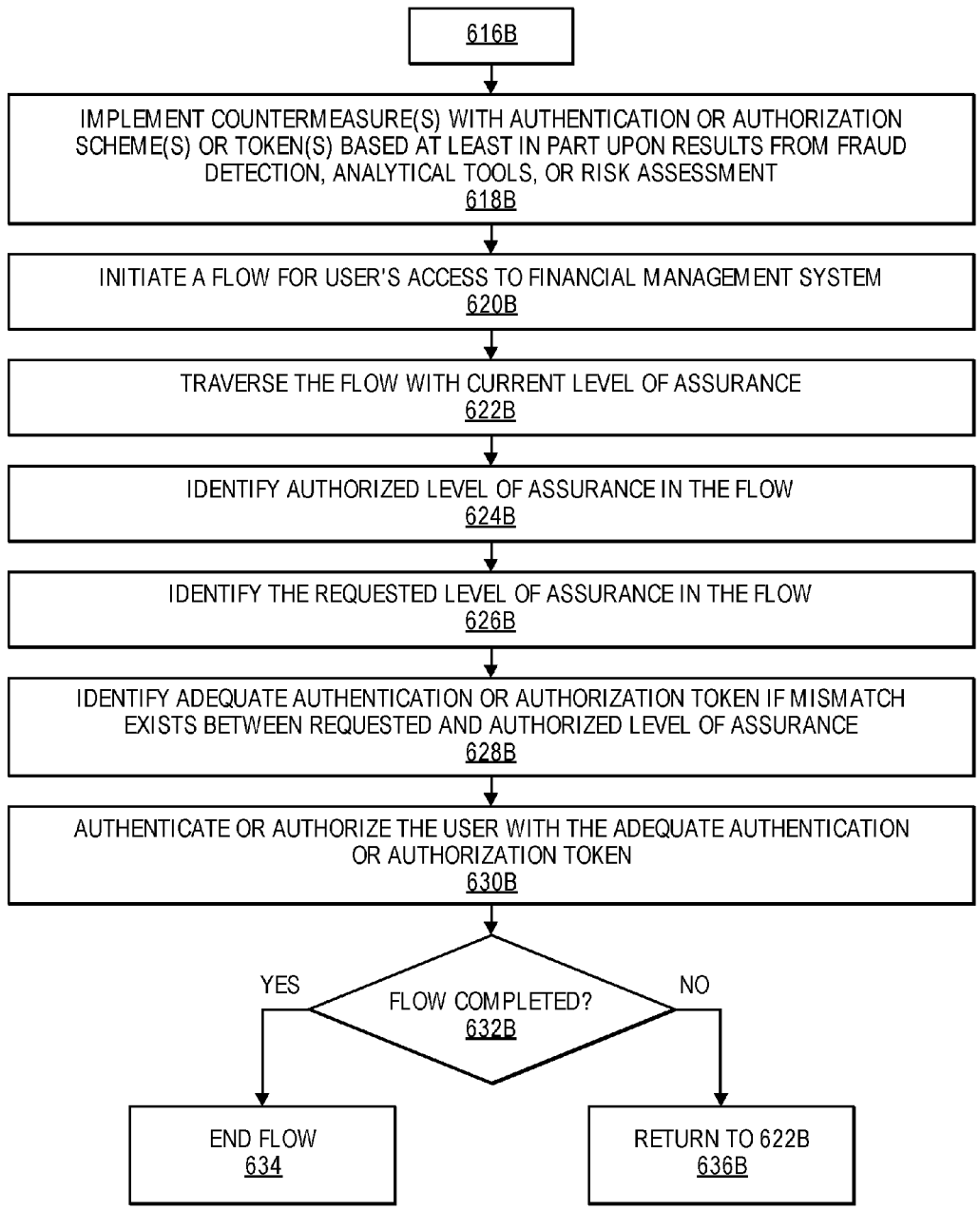

FIGS. 6B-6C jointly illustrate another illustrative flow diagram of the method or system for implementing adaptive levels of assurance in a financial management system in some embodiments. In the embodiments illustrated in FIGS. 6B-6C, the method or system may identify or determine multiple levels of assurance for multiple stages or flow nodes (collectively flow nodes) in a flow of executing a financial management system at 602B. At least some of the identified or determined multiple levels of assurance may then be associated with one or more corresponding security measures or countermeasures including one or more authentication schemes at 604B. The method or system illustrated in FIGS. 6B-6C may then identify or determine multiple stages or multiple flow nodes in the flow of a software product or service (e.g., the financial management system described above) for which authentication is required or desired at 606B.

Upon or shortly after the identification or determination of these multiple flow nodes, the method or system may associate a level of assurance with each of the multiple flow nodes at 608B. At 610B, the method or system may receive a user's request to access the software product or service including, for example, a financial management system as described herein. The method or system may optionally invoke a cyber-intelligence process or hardware module to perform fraud detection or fraud prevention at 612B.

In some embodiments, the method or system may employ techniques including predictive analytics, statistics, mathematical or numerical modeling, machine learning, data mining, heuristics-based techniques, or any other suitable techniques to perform fraud detection or fraud prevention for the user's request. For example, the method or system may perform fraud detection or fraud prevention by examining the user's request or information related to the user's request including, for example but not limited to, frequency of requests from the user such as the total number of requests from the user within a period of time, geographic locations in which the user has initiated the requests, network locations from which the user has initiated the requests, the device identifications (e.g., media access control or MAC addresses) of the devices with which the user has used in issuing the requests, actions of the user (e.g., merely browsing, copying, or printing information about personal information without actively attempting to further complete the flow), any other recognized or predicted behavior anomalies, or any combinations thereof.

At 614B, the method or system may optionally perform risk assessment or risk management. In some of the illustrated embodiments, the method or system may utilize techniques including probabilistic risk assessment, mini-Delphi techniques, or statistics approaches in its performance of risk assessment or risk management. In addition or in the alternative, the method or system may also utilize analytical tools including, for example, one or more regression tools, one or more machine learning tools, one or more artificial intelligence tools, or any other suitable tools to analyze collected information or data at 616B. At 618B, the method or system may implement one or more security measures or countermeasures with one or more authentication schemes based at least in part upon one or more result sets from 612B, 614B, or 616B.

Upon or shortly after receiving a user's request to access a software product or service including a financial management system described herein, the method or system may initiate a flow for the user's request at 620B. The user may proceed with the flow at 622B with the current level of assurance. In the embodiments illustrated in FIGS. 6B-6C, the use has not been authenticated at 622B where the user traverses the flow in response to the user's request to access the software product or service because not all software product or service requires users be authenticated immediately after requesting for access. For example, a user may request to access TURBOTAX tax preparation application by clicking on a browser bookmark or entering the URL (universal resource locator) of the website hosting the tax preparation application. The user may or may not necessarily be presented with the authentication process immediately after receiving the response to the user's request. Rather, the user may nevertheless be allowed to visit the homepage and some non-sensitive, non-critical, or non-confidential information on the website.

At 624B, the method or system may identify the authorized level of assurance in the flow according to which flow node the user is currently at. If the user has not been authenticated at all, the user is permitted to visit some non-sensitive, non-critical, or non-confidential information. If the user has already been authenticated at this point, the user is allowed to access information or data or to perform actions permitted at the current level of assurance corresponding to the authentication scheme. At 626B, the method or system may monitor the flow traversal or progression to determine or identify the requested level of assurance based at least in part upon the traversal or progression of the flow or user actions.

The method or system may then identify adequate authentication scheme at 628B if it is determined that there is a mismatch between the authorized level of assurance and the requested level of assurance that prevents the user to proceed with the flow or to perform the desired actions. At 630, the method or system authenticates the user with the adequate authentication scheme. At 632B, the method or system determines whether the flow is completed. If it is determined that the flow is completed at 632B, the method or system may proceed to 634B to end the flow. Otherwise, the method or system may return to 622B to continue to traverse the flow and repeat the various processes or modules from 622B as needed.

FIG. 7 illustrates some illustrative levels of assurance that may be associated with various points in a software flow for the use of a financial management system in some embodiments. More specifically, FIG. 7 illustrates that the architecture of the levels of assurance may be designed under the principle of least privilege. For example, FIG. 7 illustrates four levels of assurance—the first 702, the second 704, the third 706, and the fourth level of assurance 708 where the first level of assurance is associated with the least security concerns, and the fourth level of assurance is associated with the most security concerns. In this illustrated example, the first level of assurance may authorize a user to access, for example, non-sensitive, non-confidential, or non-critical information or data or to perform actions that will not compromise information or data with higher sensitivity, criticality, or confidentiality.

Therefore, the associated or corresponding authentication scheme may include, for example, a plaintext password with optional cryptographic mechanisms. The second level of assurance is associated with data, information, or user actions with some low level of sensitivity, confidentiality, or criticality that need to be protected against, for example, online guessing, session hijacking, replay attacks, or eavesdropping attacks. As a result, the second level of assurance may thus be associated with, for example, some authentication schemes stronger than those for the first level. For example, the second level of assurance may be associated with or mapped to some single factor remote network authentication schemes to safeguard the information, data, or user actions that are permitted at this second level of assurance. FIG. 7 shows that 704 appears to be included in 702. This inclusive relation shows that the security measures or countermeasures (e.g., authentication schemes) associated with or mapped to the second level of assurance may also be associated with or mapped to the first level of assurance.

The third level of assurance is associated with data, information, or user actions with some medium level of sensitivity, confidentiality, or criticality that need to be protected against, for example, threats or risks that may cause a more profound impact (e.g., higher magnitude or likelihood of occurrence of the impact). As a result, the third level of assurance may thus be associated with, for example, some authentication schemes stronger than those for the first level and for the second level. For example, the third level of assurance may be associated with or mapped to one or more multi-factor remote network authentication schemes.

In addition or in the alternative, the third level of assurance may be require identity proofing with proof of possession of allowed types of security tokens through one or more cryptographic strength protocols of various strengths for threats or risks associated with the second level of assurance, whereas the second level of assurance may not list the one or more cryptographic strength protocols as optional. FIG. 7 shows that 706 appears to be included in 704. This inclusive relation shows that the security measures or countermeasures (e.g., authentication schemes) associated with or mapped to the third level of assurance may also be associated with or mapped to the second level of assurance, and hence the first level of assurance as well.

The fourth level of assurance is associated with data, information, or user actions with some high level of sensitivity, confidentiality, or criticality that need to be protected against, for example, threats or risks that may cause a even more profound impact (e.g., higher magnitude or likelihood of occurrence of the impact) than those protected against for the third level of assurance. As a result, the fourth level of assurance may thus be associated with, for example, some authentication schemes stronger than those for the first, the second, and the third level of assurance. For example, the fourth level of assurance may be associated with or mapped to authentication schemes requiring strong cryptographic authentication of all communicating parties and all sensitive data transfers.

At the fourth level of assurance, the security measures or countermeasures are required to guard against all threats or risks associated with the third level of assurance with the associated or mapped authentication schemes. The security measures or countermeasures associated with or mapped to the fourth level of assurance may also be required to resist man-in-the-middle or man-in-the-browser attacks. In addition or in the alternative, long-term shared authentication secrets (e.g., memorized tokens, etc.) are never revealed, whereas temporary shared authentication secrets may be provided only to a mutually trusted independent verifier who is also subject to authentication.

FIG. 7 shows that 708 appears to be included in 706. This inclusive relation shows that the security measures or countermeasures (e.g., authentication schemes) associated with or mapped to the fourth level of assurance may also be associated with or mapped to the third level of assurance, and hence the first and the second levels of assurance as well.

FIG. 8A illustrates some illustrative association of various levels of assurance with some illustrative flow nodes in a flow for the use of a financial management system in some embodiments. More specifically, column 802A illustrates some illustrative flow nodes; and column 804A and 806A illustrate some illustrative levels of assurance. In addition, FIG. 8A illustrates a schematic mapping between flow nodes and corresponding levels of assurance. The levels of assurance (LOA) may be represented by numeric characters (e.g., 10, 20, 30, etc.), alphanumeric characters (e.g., A, B, C, A1, A2, A3, etc.), colors (e.g., red-orange-yellow-green-blue), or descriptive terms (e.g., high, medium-high, medium, medium-low, low, none, etc.).

It shall be noted that the levels of assurance associated with the flow nodes illustrated in FIG. 8A are presented for illustration purposes, and the numeric values in 804A or alphanumeric values in 806A are not intended to represent the absolute or relative levels of assurance. Therefore, the associated levels of assurance for various flow nodes may be varied depending on one or more criteria including, for example but not limited to, system characterization, identified vulnerabilities, identified threats or risks, security policies, analytics, risk assessment or management results, implemented security measures or countermeasures, implemented authorization schemes, heuristics, or any other suitable criteria.

In this illustrated example, accessing account information (e.g., reading, enter, or modifying information of a user account for the provided software products or services, a user's account at a financial institution such as a bank account, a brokerage account, user's credit card information such as card number, expiration date, security code, etc.) may be associated with or assigned a level of assurance of 25 or "B" that is further associated with or mapped to an adequate authentication token for adequate protection.

FIG. 8B illustrates some illustrative association of various levels of assurance with some illustrative authentication schemes or tokens for the use of a financial management system in some embodiments. More specifically, column 802B illustrates some illustrative authentication schemes or tokens; and column 804B and 806B illustrate some illustrative levels of assurance associated with the illustrative authentication schemes or tokens. In addition, FIG. 8B illustrates a schematic mapping between authentication schemes and corresponding levels of assurance. It shall be noted that the terms "authentication scheme" and "authentication token" may be used interchangeably throughout this application, unless otherwise specifically recited or claimed.

It shall be noted that the levels of assurance associated with the illustrative authentication schemes illustrated in FIG. 8B are presented for illustration purposes, and other authentication schemes may also be incorporated or utilized. Therefore, the authentication schemes associated various levels of assurance are not intended to limit the use of other authentication schemes or association of a different authentication scheme with a particular level of assurance. In some embodiments, the method or system associates a level of assurance with or maps a level of assurance to an authentication scheme based at least in part upon the principle of least privilege.

That is, authentication schemes associated with or mapped to a higher level of assurance (e.g., higher LOA value) may also be associated with or mapped to lower level of assurance. The multi-factor authentication associated with or mapped to LOA value of 25 is distinguishable from a multi-stage authentication. More specifically, a multi-factor authentication scheme or token includes a scheme or toke that uses two or more factors to achieve authentication. For example a two-factor authentication token may use "something a user is" and "something a user has" to authentication the user. A practical example of a multi-factor token includes token that uses a private key on a smart card and a personal identification number (PIN), which is used to activate the private key, to authenticate the user that possesses and controls the PIN and the smart card.

On the other hand, a multi-stage authentication scheme or token includes a token that uses a single-factor to obtain a second authentication token. A multi-stage authentication token is considered only as strong as its weakest token. Therefore, a multi-stage authentication token is not a multi-factor authentication token, and its associated level of assurance is the level of assurance of the weakest token. For example, a user may use the username and password to authenticate the user and unlock or download a cryptographic token with strong cryptographic strength. The user may subsequently use the cryptographic token to authenticate the user to a remote system. Assuming the username and password authentication token is weaker than the cryptographic token. This two-stage authentication token is as strong as the username and password authentication token and thus is to be associated with the same level of assurance with which the username and password authentication token is associated.

FIG. 8C illustrates some illustrative association of various levels of assurance with some other illustrative flow nodes in a flow for the use of a financial management system in some embodiments. More specifically, column 802C illustrates some illustrative authentication tokens; and column 804C and 806C illustrate some illustrative levels of assurance associated with the illustrative authentication schemes or tokens. In addition, FIG. 8C illustrates a schematic mapping between authentication tokens and corresponding levels of assurance. An out-of-band token may be used to distribute shared secrets (e.g., temporary shared secrets, a symmetric key, SMS one-time password or code, etc.) for some levels of assurance via a different channel (e.g., a covert channel, another communication device, etc.) that is different from the channel for the authentication process. The distributed shared secrets may be used to, for example, initialize or enable the operations of security mechanisms for authentication purposes.

Figure 8D:
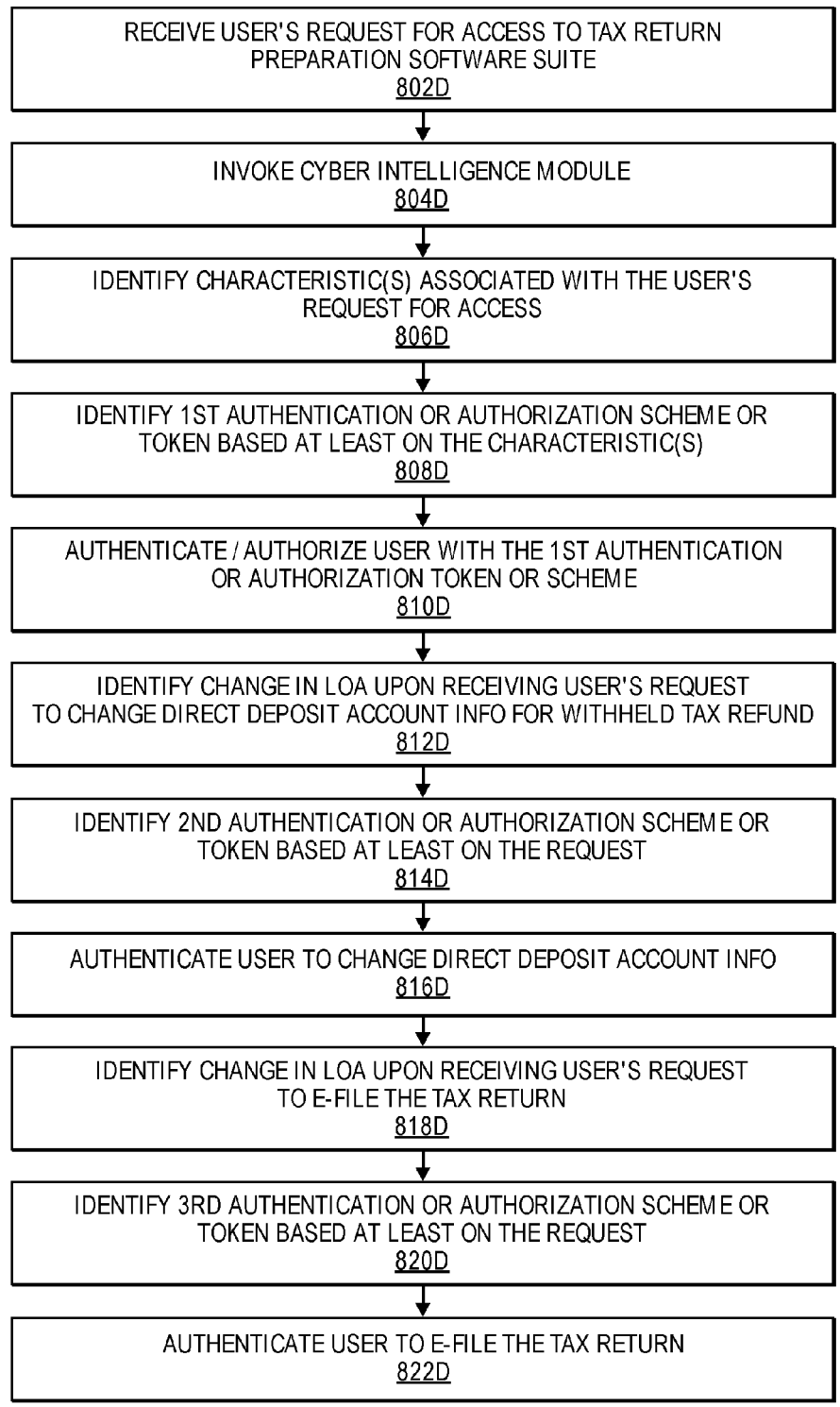
FIG. 8D illustrates an illustrative use case of the use of implementing adaptive levels of assurance in a financial management system in some embodiments.

FIG. 8D illustrates an illustrative use case of the use of implementing adaptive levels of assurance in a financial management system in some embodiments. In the embodiments illustrated in FIG. 8D, a user requests to access an online tax return preparation software product or service hosted on a computing system that is remotely located from the user's computing system. At 802D, the method or system receives the user's request to access to a tax return preparation software service hosted on a remotely located computing system. The method or system may invoke, either before or shortly after receiving the user's request, a cyber-intelligence process or module at 804D.

One or more characteristics associated with the user's request may be identified at 806D. The method or system may identify a first authentication token based at least in part upon the user's request or the identified one or more characteristics associated with the user's request at 808D by using at least the cyber-intelligence process or module. For example, the method or system may examine an earlier and a subsequent authentication attempts within a period of time from multiple, different geographic locations and determine that the subsequent authentication attempt may constitute an online fraudulent attempt to compromise the integrity or confidentiality of the information or data. The method or system in this example may thus identify an appropriate level of assurance with heightened security for the subsequent authentication attempt at 808D. At 810D, the method or system may authenticate the user with the first authentication token.

Upon the user's successful authentication, the method or the system may allow the user to traverse the part of the flow permitted by the appropriate level of assurance associated with the first authentication token. At 812D, the method or system may further identify a change in the level of assurance upon receiving the user's request (e.g., by clicking or other types of user actions) to change the direct deposit account information or to access information including the user's taxpayer identification number (e.g., employer identification number, social security number, individual taxpayer identification number, etc.)

Assuming that the method or system determines that the user has not been authenticated to access such sensitive information, the method or system may further identify a second authentication token based at least in part upon the user's request to change direct deposit account information or to access the user's taxpayer identification number at 814D. The user is then presented with the authentication process with the second authentication token and may proceed to change the direct deposit account information or to access the user's taxpayer identification number at 816D. At 818D, the method or system further identifies another change in the authorized level of assurance upon or shortly after receiving the user's request to electronically file (e-file) the tax return prepared with the online tax return preparation software product or service.

Assuming that the method or system determines that the user has not been authenticated to electronically file the prepared tax return, the method or system may further identify a third authentication token based at least in part upon the user's request to electronically file the prepared tax return at 820D. Prior to the user's request to electronically file the tax return, the user is freely to navigate the part of the flow permitted by level of assurance associated with the second authentication token as well as the other levels associated with equal or lesser authentication strength tokens. At 822D, the method or system may authenticate the user to permit the user to electronically file the tax return.

System Architecture Overview

Figure 9:
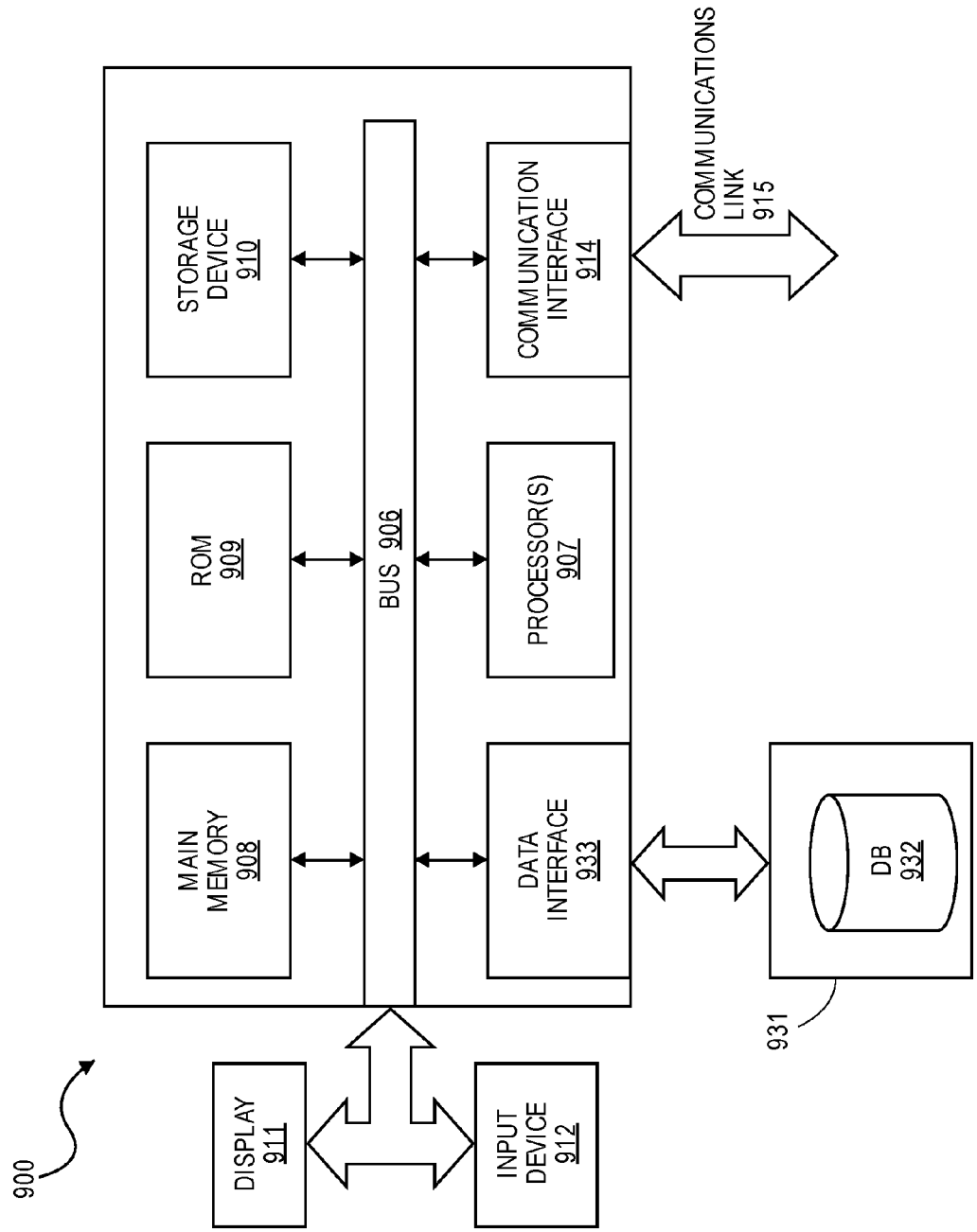
FIG. 9 illustrates a block diagram of an illustrative computing system 900 suitable for implementing various embodiments described herein.

FIG. 9 illustrates a block diagram of components of an illustrative computing system 900 suitable for implementing various embodiment of the invention. For example, the exemplary computing system 900 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 900 includes a bus 906 or other communication mechanism for communicating information, which interconnects subsystems and devices, such as processor 907, system memory 908 (e.g., RAM), static storage device 909 (e.g., ROM), disk drive 910 (e.g., magnetic or optical), communication interface 914 (e.g., modem or Ethernet card), display 911 (e.g., CRT or LCD), input device 912 (e.g., keyboard), and cursor control (not shown).

According to one embodiment of the invention, computer system 900 performs specific operations by one or more processors or processor cores 907 executing one or more sequences of one or more instructions contained in system memory 908. Such instructions may be read into system memory 908 from another computer readable/usable storage medium, such as static storage device 909 or disk drive 910. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 907 may be used to perform various actions such as various actions, processes, or modules involving determining, analyzing, performing actions, etc. In some embodiments, at least one of the one or more processors or processor cores 907 has the multithreading capability.

In one embodiment, the term "logic" shall mean any combination of software or hardware that is used to implement all or part of the invention. In the single embodiment or in some embodiments, the one or more processors or processor cores 907 may be used to perform various acts such as various acts involving determining, analyzing, performing actions, etc. In some embodiments, at least one of the one or more processors or processor cores 907 has the multithreading capability to execute a plurality of threads to perform various tasks as described in the preceding sections.

Various actions as described in the preceding paragraphs may be performed by using one or more processors, one or more processor cores, or combination thereof 907. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 900. According to other embodiments of the invention, two or more computer systems 900 coupled by communication link 915 (e.g., LAN, PTSN, or wireless network) may perform the sequence of instructions required to practice the invention in coordination with one another.

Computer system 900 may transmit and receive messages, data, and instructions, including program, i.e., application code, through communication link 915 and communication interface 914. Received program code may be executed by processor 907 as it is received, and/or stored in disk drive 910, or other non-volatile storage for later execution. In an embodiment, the computer system 900 operates in conjunction with a data storage system 931, e.g., a data storage system 931 that contains a database 932 that is readily accessible by the computer system 900. The computer system 900 communicates with the data storage system 931 through a data interface 933. A data interface 933, which is coupled to or in communication with the bus 906, transmits and receives electrical, electromagnetic or optical signals that include data streams representing various types of signal information, e.g., instructions, messages and data. In embodiments of the invention, the functions of the data interface 933 may be performed by the communication interface 914.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for implementing adaptive levels of assurance in a financial management system, the method being performed by a server and comprising:
   the server initiating a flow for a user's request for access to the financial management system residing on the at least one computing system;
   the server monitoring traversal of the flow for the access by a user requesting the access to the financial management system, wherein the financial management system comprises at least a tax return preparation software product or service operable to prepare an electronic tax return;
   the server providing multiple adaptive levels of assurance corresponding to one or more authentication tokens for the flow based at least in part upon sensitivity of information involved in the access by the user to provide adequate security;
   the server increasing a current level of assurance to a heightened level of assurance associated with one or more heightened security requirements when the access includes electronic filing of a tax return or accessing information of one or more accounts of the user; and
   the server authenticating or authorizing the user's request for access to different portions with respective sensitivities of the financial management system that resides on the server at least by generating one or more authenticators with the one or more authentication tokens according to the respective sensitivities for the multiple adaptive level of assurance.

2. The computer implemented method of claim 1, further comprising:
   the server invoking a cyber-intelligence process; and
   the server identifying or determining at least one level of assurance by using a cyber-intelligence process to examine the user's request or one or more characteristics associated with the user's request.

3. The computer implemented method of claim 1, further comprising:
   the server identifying a first authentication token, wherein the first authentication token corresponds to a first level of assurance in the adaptive levels of assurance;
   the server authenticating the user with the first authentication token; and
   the server authorizing the user to access first information having first sensitivity on the financial management system or to perform one or more first actions on the financial management system, wherein the first information is accessible at the first level of assurance, and the one or more actions are permitted at the first level of assurance in the adaptive levels of assurance.

4. The computer implemented method of claim 3, further comprising:
   the server identifying or determining a first change in assurance level during the traversal of the flow;
   the server identifying a second authentication token in response to the first change, wherein the second authentication token corresponds to a second level of assurance in the adaptive levels of assurance;
   the server authenticating the user with the second authentication token; and
   the server authorizing the user to access second information having second sensitivity on the financial management system or to perform one or more second actions on the financial management system, wherein the second information is accessible at the second level of assurance, and the one or more actions are permitted at the second level of assurance in the adaptive levels of assurance.

5. The computer implemented method 1, further comprising:
   the server gathering analytics;
   the server analyzing the analytics; and
   the server performing risk assessment based at least in part upon the analytics or results of analyzing the analytics.

6. The computer implemented method 5, further comprising:
   the server characterizing the server or one or more other computing systems associated with execution of the financial management system;
   the server identifying a potential threat associated with the execution of the financial management system; and
   the server identifying vulnerability associated with the execution of the financial management system.

7. The computer implemented method 6, further comprising:
   the server determining or rating likelihood of occurrence of the potential threat for the financial management system;
   the server determining risks or levels of the risks for the financial management system;
   the server mapping the risks or the levels of the risks to at least some of the adaptive levels of assurance for the financial management system; and
   the server determining one or more risk control measures or adequacy of the one or more risk control measures for each of at least some of the adaptive levels for the financial management system.

8. The computer implemented method of claim 1, further comprising at least one of:
   the server performing fraud detection or fraud prevention for the user's request based at least in part upon one or more criteria by using one or more tools.

9. The computer implemented method of claim 8, wherein the one or more tools include at least one of a statistical tool, a predictive modeling tool, a machine learning tool, a data mining tool, and a heuristics-based tool, and the one or more criteria include at least one of:
   a total number of multiple user requests within a period of time;
   one or more geographic locations from which the multiple user's requests are initiated;
   one or more network locations from which the multiple user's requests are initiated;
   one or more computing device identifications of one or more corresponding computing devices from which the multiple user's requests are issued; and
   one or more actions of a user during the flow for the user's request for access to the financial management system.

10. The computer implemented method of claim 1, further comprising:
    the server mapping one or more authentication tokens to each of at least some of the adaptive levels for the financial management system.

11. The computer implemented method of claim 1, wherein the financial management system comprises at least one of an accounting software product or service, a payroll software product or service, a personal finance management software product or service, and a corporate finance management software product or service.

12. The computer implemented method of claim 11, wherein the financial management system does not include an online banking software product or service.

13. The computer implemented method of claim 1, wherein the one or more authentication tokens comprise an out-of-band authentication token that corresponds to at least one assurance level of the adaptive levels of assurance.

14. A system for implementing adaptive levels of assurance in a financial management system, comprising:
a server, a financial management system installed thereupon, and non-transitory memory allocated for the financial management system and is at least to:
initiate a flow for a user's request for access to the financial management system residing on the server;
monitor traversal of the flow for the access by a user requesting the access to the financial management system, wherein the financial management system comprises at least a tax return preparation software product or service operable to prepare an electronic tax return;
provide adequate security by providing multiple adaptive levels of assurance corresponding to one or more authentication tokens for the flow based at least in part upon sensitivity of information involved in the access by the user to provide adequate security;
increase a current level of assurance to a heightened level of assurance associated with one or more heightened security requirements when the access includes electronic filing of a tax return or accessing information of one or more accounts of the user; and
the server authenticating or authorizing the user's request for access to different portions with respective sensitivities of the financial management system that resides on the server at least by generating one or more authenticators with the one or more authentication tokens according to the respective sensitivities for the multiple adaptive level of assurance.

15. The system of claim 14, wherein the server is further to:
invoke a cyber-intelligence process; and
identify or determine at least one level of assurance by using a cyber-intelligence process to examine the user's request or one or more characteristics associated with the user's request.

16. The system of claim 14, wherein the server is further to:
identify a first authentication token, wherein the first authentication token corresponds to a first level of assurance in the adaptive levels of assurance; and
authenticate the user with the first authentication token; and
authorize the user to access first information having first sensitivity on the financial management system or to perform one or more first actions on the financial management system, wherein the first information is accessible at the first level of assurance, and the one or more actions are permitted at the first level of assurance in the adaptive levels of assurance.

17. The system of claim 16, wherein the server is further to:
identify or determine a first change in assurance level during the traversal of the flow;
identify a second authentication token in response to the first change, wherein the second authentication token corresponds to a second level of assurance in the adaptive levels of assurance;
authenticate the user with the second authentication token; and
authorize the user to access second information having second sensitivity on the financial management system or to perform one or more second actions on the financial management system, wherein the second information is accessible at the second level of assurance, and the one or more actions are permitted at the second level of assurance in the adaptive levels of assurance.

18. The system of claim 16, wherein the server is further to:
gather analytics;
analyze the analytics; and
perform risk assessment based at least in part upon the analytics or results of analyzing the analytics.

19. The system of claim 18, wherein the server is further to:
characterize the server or one or more other computing systems associated with execution of the financial management system;
identify a potential threat associated with the execution of the financial management system; and
identify vulnerability associated with the execution of the financial management system.

20. The system of claim 19, wherein the server is further to:
determine or rating likelihood of occurrence of the potential threat for the financial management system;
determine risks or levels of the risks for the financial management system;
map the risks or the levels of the risks to at least some of the adaptive levels of assurance for the financial management system; and
determine one or more risk control measures or adequacy of the one or more risk control measures for each of at least some of the adaptive levels for the financial management system.

21. A computer program product comprising a non-transitory computer accessible storage medium having stored thereupon a sequence of instructions which, when executed by server, cause the server to perform a process for implementing adaptive levels of assurance in a financial management system, the process being performed by the server and comprising:
the server initiating a flow for a user's request for access to the financial management system residing on the server;
the server monitoring traversal of the flow for the access by a user requesting the access to the financial management system, wherein the financial management system comprises at least a tax return preparation software product or service operable to prepare an electronic tax return;
the server providing adequate security by providing multiple adaptive levels of assurance corresponding to one or more authentication tokens for the flow based at least in part upon sensitivity of information involved in the access by the user to provide adequate security;
the server increasing a current level of assurance to a heightened level of assurance associated with one or more heightened security requirements when the access includes electronic filing of a tax return or accessing information of one or more accounts of the user; and
the server authenticating or authorizing the user's request for access to different portions with respective sensitivities of the financial management system that resides on the server at least by generating one or more authenticators with the one or more authentication tokens according to the respective sensitivities for the multiple adaptive level of assurance.

22. The computer program product of claim 21, the process further comprising:
the server invoking a cyber-intelligence process; and
the server identifying or determining at least one level of assurance by using a cyber-intelligence process to examine the user's request or one or more characteristics associated with the user's request.

23. The computer program product of claim 21, the process further comprising:
the server identifying a first authentication token, wherein the first authentication token corresponds to a first level of assurance in the adaptive levels of assurance; and
the server authenticating the user with the first authentication token; and
the server authorizing the user to access first information having first sensitivity on the financial management system or to perform one or more first actions on the financial management system, wherein the first information is accessible at the first level of assurance, and the one or more actions are permitted at the first level of assurance in the adaptive levels of assurance.

24. The computer program product of claim 23, the process further comprising:
the server identifying or determining a first change in assurance level during the traversal of the flow;
the server identifying a second authentication token in response to the first change, wherein the second authentication token corresponds to a second level of assurance in the adaptive levels of assurance;
the server authenticating the user with the second authentication token; and
server authorizing the user to access second information having second sensitivity on the financial management system or to perform one or more second actions on the financial management system, wherein the second information is accessible at the second level of assurance, and the one or more actions are permitted at the second level of assurance in the adaptive levels of assurance.

25. The computer program product of claim 23, the process further comprising:
the server gathering analytics;
the server analyzing the analytics; and
the server performing risk assessment based at least in part upon the analytics or results of analyzing the analytics.

26. The computer program product of claim 25, the process further comprising:
the server characterizing the server or one or more other computing systems associated with execution of the financial management system;
the server identifying a potential threat associated with the execution of the financial management system; and
the server identifying vulnerability associated with the execution of the financial management system.

27. The computer program product of claim 26, the process further comprising:
the server determining or rating likelihood of occurrence of the potential threat for the financial management system;
the server determining risks or levels of the risks for the financial management system;
the server mapping the risks or the levels of the risks to at least some of the adaptive levels of assurance for the financial management system; and
the server determining one or more risk control measures or adequacy of the one or more risk control measures for each of at least some of the adaptive levels for the financial management system.

28. A computer implemented method for implementing adaptive levels of assurance in a financial management system, the method being performed by a server and comprising:
the server initiating a flow for a user's request for access to the financial management system residing on the at least one computing system;
the server monitoring traversal of the flow for the access by a user requesting for the access to the financial management system;
the server providing multiple adaptive levels of assurance corresponding to one or more authentication tokens for the flow based at least in part upon sensitivity of information involved in the access by the user to provide adequate security;
the server authenticating or authorizing the user's request for access to different portions with respective sensitivities of the financial management system that resides on the server at least by generating one or more authenticators with the one or more authentication tokens according to the respective sensitivities for the multiple adaptive level of assurance;
the server identifying a first authentication token, wherein the first authentication token corresponds to a first level of assurance in the adaptive levels of assurance;
the server authenticating the user with the first authentication token;
the server authorizing the user to access first information having first sensitivity on the financial management system or to perform one or more first actions on the financial management system, wherein the first information is accessible at the first level of assurance, and the one or more actions are permitted at the first level of assurance in the adaptive levels of assurance;
the server identifying or determining a first change in assurance level during the traversal of the flow;
the server identifying a second authentication token in response to the first change, wherein the second authentication token corresponds to a second level of assurance in the adaptive levels of assurance;
the server authenticating the user with the second authentication token; and
the server authorizing the user to access second information having second sensitivity on the financial management system or to perform one or more second actions on the financial management system, wherein the second information is accessible at the second level of assurance, and the one or more actions are permitted at the second level of assurance in the adaptive levels of assurance.

29. The computer implemented method 28, further comprising:
the server gathering analytics;
the server analyzing the analytics; and
the server performing risk assessment based at least in part upon the analytics or results of analyzing the analytics.

30. The computer implemented method 29, further comprising:

the server characterizing the server or one or more other computing systems associated with execution of the financial management system;

the server identifying a potential threat associated with the execution of the financial management system; and the server identifying vulnerability associated with the execution of the financial management system.

31. The computer implemented method 30, further comprising:

the server determining or rating likelihood of occurrence of the potential threat for the financial management system;

the server determining risks or levels of the risks for the financial management system;

the server mapping the risks or the levels of the risks to at least some of the adaptive levels of assurance for the financial management system; and the server determining one or more risk control measures or adequacy of the one or more risk control measures for each of at least some of the adaptive levels for the financial management system.

32. A system for implementing adaptive levels of assurance in a financial management system, comprising:

a server, a financial management system installed thereupon, and non-transitory memory allocated for the financial management system and is at least to:

initiate a flow for a user's request for access to the financial management system residing on the server;

monitor traversal of the flow for the access by a user requesting for the access to the financial management system;

provide adequate security by providing multiple adaptive levels of assurance corresponding to one or more authentication tokens for the flow based at least in part upon sensitivity of information involved in the access by the user to provide adequate security;

authenticate or authorize the user's request for access to different portions with respective sensitivities of the financial management system that resides on the server at least by generating one or more authenticators with the one or more authentication tokens according to the respective sensitivities for the multiple adaptive level of assurance;

identify a first authentication token, wherein the first authentication token corresponds to a first level of assurance in the adaptive levels of assurance;

authenticate the user with the first authentication token;

authorize the user to access first information having first sensitivity on the financial management system or to perform one or more first actions on the financial management system, wherein the first information is accessible at the first level of assurance, and the one or more actions are permitted at the first level of assurance in the adaptive levels of assurance;

identify or determine a first change in assurance level during the traversal of the flow;

identify a second authentication token in response to the first change, wherein the second authentication token corresponds to a second level of assurance in the adaptive levels of assurance;

authenticate the user with the second authentication token; and authorize the user to access second information having second sensitivity on the financial management system or to perform one or more second actions on the financial management system, wherein the second information is accessible at the second level of assurance, and the one or more actions are permitted at the second level of assurance in the adaptive levels of assurance.

33. The system of claim 32, wherein the server, the financial management system installed thereupon, and the non-transitory memory allocated for the financial management system is at least to:

perform fraud detection or fraud prevention for the user's request based at least in part upon one or more criteria by using one or more tools.

34. The system of claim 33, wherein the one or more tools include at least one of a statistical tool, a predictive modeling tool, a machine learning tool, a data mining tool, and a heuristics-based tool, and the one or more criteria include at least one of:

a total number of multiple user requests within a period of time;

one or more geographic locations from which the multiple user's requests are initiated;

one or more network locations from which the multiple user's requests are initiated;

one or more computing device identifications of one or more corresponding computing devices from which the multiple user's requests are issued; and one or more actions of a user during the flow for the user's request for access to the financial management system.

35. The system of claim 32, wherein the server, the financial management system installed thereupon, and the non-transitory memory allocated for the financial management system is at least to:

the server invoking a cyber-intelligence process; and the server identifying or determining at least one level of assurance by using a cyber-intelligence process to examine the user's request or one or more characteristics associated with the user's request.

36. A computer program product comprising a non-transitory computer accessible storage medium having stored thereupon a sequence of instructions which, when executed by server, cause the server to perform a set of acts for implementing adaptive levels of assurance in a financial management system, the process being performed by the server, and the set of acts comprising:

the server initiating a flow for a user's request for access to the financial management system residing on the at least one computing system;

the server monitoring traversal of the flow for the access by a user requesting for the access to the financial management system;

the server providing multiple adaptive levels of assurance corresponding to one or more authentication tokens for the flow based at least in part upon sensitivity of information involved in the access by the user to provide adequate security;

the server authenticating or authorizing the user's request for access to different portions with respective sensitivities of the financial management system that resides on the server at least by generating one or more authenticators with the one or more authentication tokens according to the respective sensitivities for the multiple adaptive level of assurance;

the server identifying a first authentication token, wherein the first authentication token corresponds to a first level of assurance in the adaptive levels of assurance;

the server authenticating the user with the first authentication token;

the server authorizing the user to access first information having first sensitivity on the financial management system or to perform one or more first actions on the financial management system, wherein the first information is accessible at the first level of assurance, and the one or more actions are permitted at the first level of assurance in the adaptive levels of assurance;

the server identifying or determining a first change in assurance level during the traversal of the flow;

the server identifying a second authentication token in response to the first change, wherein the second authentication token corresponds to a second level of assurance in the adaptive levels of assurance;

the server authenticating the user with the second authentication token; and the server authorizing the user to access second information having second sensitivity on the financial management system or to perform one or more second actions on the financial management system, wherein the second information is accessible at the second level of assurance, and the one or more actions are permitted at the second level of assurance in the adaptive levels of assurance.

37. The computer program product 36, the set of acts further comprising:

the server gathering analytics;

the server analyzing the analytics; and the server performing risk assessment based at least in part upon the analytics or results of analyzing the analytics.

38. The computer program product 37, the set of acts further comprising:

the server characterizing the server or one or more other computing systems associated with execution of the financial management system;

the server identifying a potential threat associated with the execution of the financial management system; and the server identifying vulnerability associated with the execution of the financial management system.

39. The computer program product 38, the set of acts further comprising:

the server determining or rating likelihood of occurrence of the potential threat for the financial management system;

the server determining risks or levels of the risks for the financial management system;

the server mapping the risks or the levels of the risks to at least some of the adaptive levels of assurance for the financial management system; and the server determining one or more risk control measures or adequacy of the one or more risk control measures for each of at least some of the adaptive levels for the financial management system.

* * * * *

UNITED STATES PATENT AND TRADEMARK OFFICE
CERTIFICATE OF CORRECTION

PATENT NO. : 9,444,824 B1  
APPLICATION NO. : 14/194490  
DATED : September 13, 2016  
INVENTOR(S) : Alex G. Balazs et al.

Page 1 of 1

It is certified that error appears in the above-identified patent and that said Letters Patent is hereby corrected as shown below:

In the Claims

Column 23, lines 9-10 reading -the at least one computing system;- should read --the server;--

Column 28, lines 13-14 reading -the at least one computing system;- should read --the server;--

Column 30, lines 44-45 reading -the at least one computing system;- should read --the server;--

Signed and Sealed this  
Twentieth Day of December, 2016

Michelle K. Lee  
*Director of the United States Patent and Trademark Office*